(12) United States Patent
Rhim et al.

(10) Patent No.: US 12,328,546 B2
(45) Date of Patent: *Jun. 10, 2025

(54) DISPLAY APPARATUS

(71) Applicant: LG Display Co., Ltd., Seoul (KR)

(72) Inventors: Jusang Rhim, Paju-si (KR); MinJin Lee, Paju-si (KR); DaeYong Kim, Paju-si (KR); Eunhee Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,300

(22) Filed: Jan. 16, 2024

(65) Prior Publication Data

US 2024/0155286 A1 May 9, 2024

Related U.S. Application Data

(63) Continuation of application No. 17/242,641, filed on Apr. 28, 2021, now Pat. No. 11,917,364.

(30) Foreign Application Priority Data

Apr. 29, 2020 (KR) .................... 10-2020-0052520

(51) Int. Cl.
*H04R 1/34* (2006.01)
*G06F 3/16* (2006.01)
(Continued)

(52) U.S. Cl.
CPC ............ *H04R 1/345* (2013.01); *G06F 3/165* (2013.01); *H04R 1/028* (2013.01); *H04R 1/403* (2013.01);
(Continued)

(58) Field of Classification Search
None
See application file for complete search history.

(56) References Cited

U.S. PATENT DOCUMENTS

2014/0247959 A1* 9/2014 Yamanaka ............. H04R 1/345
381/388
2016/0014367 A1* 1/2016 Yeo ........................ H04N 5/642
348/836
(Continued)

FOREIGN PATENT DOCUMENTS

CN 108989957 A 12/2018
CN 109994060 A 7/2019
(Continued)

OTHER PUBLICATIONS

Office Action issued in corresponding Korean Patent Application No. 10-2020-0052520, dated Apr. 4, 2024. (Note: JP 2014-171049 A, and JP 2017-163468 A were previously cited).
(Continued)

*Primary Examiner* — Duc Nguyen
*Assistant Examiner* — Assad Mohammed
(74) *Attorney, Agent, or Firm* — Morgan, Lewis & Bockius LLP

(57) ABSTRACT

A display apparatus includes a display module including a display panel configured to display an image, a structure at a rear surface of the display module, and a vibration generator at the structure. The structure may include a nonlinear portion covering a periphery of the rear surface of the display module and a sound emission port spaced apart from the rear surface of the display module.

38 Claims, 10 Drawing Sheets

(51) Int. Cl.
*H04R 1/02* (2006.01)
*H04R 1/40* (2006.01)
*H04R 3/12* (2006.01)
*H04R 9/02* (2006.01)
*H04R 9/04* (2006.01)
*H04R 9/06* (2006.01)

(52) U.S. Cl.
CPC .............. *H04R 3/12* (2013.01); *H04R 9/025* (2013.01); *H04R 9/043* (2013.01); *H04R 9/06* (2013.01); *H04R 2400/11* (2013.01); *H04R 2499/15* (2013.01)

(56) References Cited

U.S. PATENT DOCUMENTS

| | | | |
|---|---|---|---|
| 2016/0187710 A1* | 6/2016 | An | G02F 1/133308 349/58 |
| 2016/0269832 A1 | 9/2016 | Nakamura et al. | |
| 2017/0076658 A1 | 3/2017 | Yeo et al. | |
| 2018/0053813 A1* | 2/2018 | Choi | H04R 9/06 |
| 2018/0167724 A1* | 6/2018 | Jung | H04R 1/026 |
| 2018/0352314 A1* | 12/2018 | Lee | H04R 9/025 |
| 2019/0037164 A1* | 1/2019 | Kim | H04R 17/005 |
| 2019/0149908 A1 | 5/2019 | Kim et al. | |
| 2019/0182573 A1 | 6/2019 | Shin et al. | |
| 2019/0208300 A1 | 7/2019 | Lee et al. | |
| 2019/0324501 A1 | 10/2019 | Kim et al. | |
| 2020/0092650 A1 | 3/2020 | Ham et al. | |
| 2020/0100022 A1 | 3/2020 | Shin et al. | |
| 2020/0133338 A1* | 4/2020 | Han | G06F 1/1652 |
| 2020/0196046 A1* | 6/2020 | Park | H04M 1/026 |
| 2021/0345037 A1 | 11/2021 | Rhim et al. | |

FOREIGN PATENT DOCUMENTS

| | | |
|---|---|---|
| JP | 02145891 U | 12/1990 |
| JP | 2006-237826 A | 9/2006 |
| JP | 2014-171049 A | 9/2014 |
| JP | 2015-103962 A | 6/2015 |
| JP | 2016072655 A | 5/2016 |
| JP | 2017-163468 A | 9/2017 |
| JP | 2019191587 A | 10/2019 |
| JP | 2020-048194 A | 3/2020 |
| KR | 10-2019-0054431 A | 5/2019 |
| KR | 1020190070567 A | 6/2019 |
| KR | 10-2020-0033597 A | 3/2020 |
| TW | 201944628 A | 11/2019 |
| TW | 202013994 A | 4/2020 |
| TW | 202141140 A | 11/2021 |
| TW | 202213994 A | 4/2022 |

OTHER PUBLICATIONS

Office Action dated Jun. 28, 2022, issued in corresponding Taiwanese Patent Application No. 11120633430.
Office Action dated Mar. 23, 2022, issued in corresponding Japanese Patent Application No. 2021-074170.
Office Action issued in corresponding Chinese Patent Application No. 202110459119.5, dated Oct. 26, 2023. (Note: US 2018/053813 A1, US 2016/014367 A1, and US 2018/352314 A1 were previously cited).
Office Action issued in corresponding Japanese Patent Application No. 2022-123181, dated Aug. 29, 2023.
Office Action dated Sep. 26, 2024 issued in corresponding Taiwanese Patent Application No. 112103151. (Note: JP 2017-163468 A was previously cited).

* cited by examiner

DISPLAY APPARATUS

CROSS-REFERENCE TO RELATED APPLICATIONS

This application is a continuation of U.S. patent application Ser. No. 17/242,641, filed on Apr. 28, 2021, which claims the benefit of and priority to Korean Patent Application No. 10-2020-0052520 filed on Apr. 29, 2020, the entirety of each of which is hereby incorporated by reference as if fully set forth herein.

TECHNICAL FIELD

The present disclosure relates to a display apparatus, and more particularly, to a display apparatus including a display module which outputs a sound.

DISCUSSION OF THE RELATED ART

Display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image.

Display apparatuses may include a display panel (or a display module) for displaying an image and a sound device for outputting a sound associated with the image.

However, in display apparatuses, because a sound output from a sound device may travel to a rearward or a downward direction of the display apparatus, sound quality may be degraded due to interference between sounds reflected from a wall and the ground. For this reason, it may be difficult to transfer an accurate sound, and the immersion experience of a viewer is reduced.

SUMMARY

Accordingly, embodiments of the present disclosure are directed to providing a display apparatus that substantially obviates one or more problems due to limitations and disadvantages of the related art.

The inventors have recognized problems of the display apparatuses described above and have performed various experiments so that, when a user in front of a display panel (or a display module) is watching an image, a traveling direction of a sound is a forward direction of the display panel. Thus, sound quality may be enhanced. Thus, through the various experiments, the inventors have invented a display apparatus having a new structure, which may generate a sound traveling in a forward region of the display panel, thereby enhancing sound quality.

An aspect of the present disclosure is to provide a display apparatus for improving sound quality and increasing an immersion experience of a viewer.

Another aspect of the present disclosure is to provide a display apparatus which generates a sound traveling in a forward direction of a display module.

Additional features and aspects will be set forth in part in the description that follows, and in part will become apparent from the description or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display apparatus comprises a display module including a display panel configured to display an image, a structure at a rear surface of the display module, and a vibration generator at the structure. The structure may include a nonlinear portion to cover a periphery of the rear surface of the display module and a sound emission port spaced apart from the rear surface of the display module.

In another aspect, a display apparatus comprises a display module including a display panel configured to display an image, a first vibration generating module at a first region of a rear surface of the display module, and a second vibration generating module at a second region of the rear surface of the display module. Each of the first and second vibration generating modules may include a vibration generator configured to output a sound to the rear surface of the display module, and a structure configured to support the vibration generator. The structure may include a nonlinear portion guiding a sound output from the vibration generator to one side of the display module and a sound emission port spaced apart from the rear surface of the display module.

The display apparatus according to some embodiments of the present disclosure may output a sound in a forward direction and a lateral direction of a display module.

The display apparatus according to some embodiments of the present disclosure may enhance a sound of a low-pitched sound band to a high-pitched sound band.

According to some embodiments of the present disclosure, a thickness of periphery of a display apparatus may be reduced.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles of the disclosure.

Figure 1:
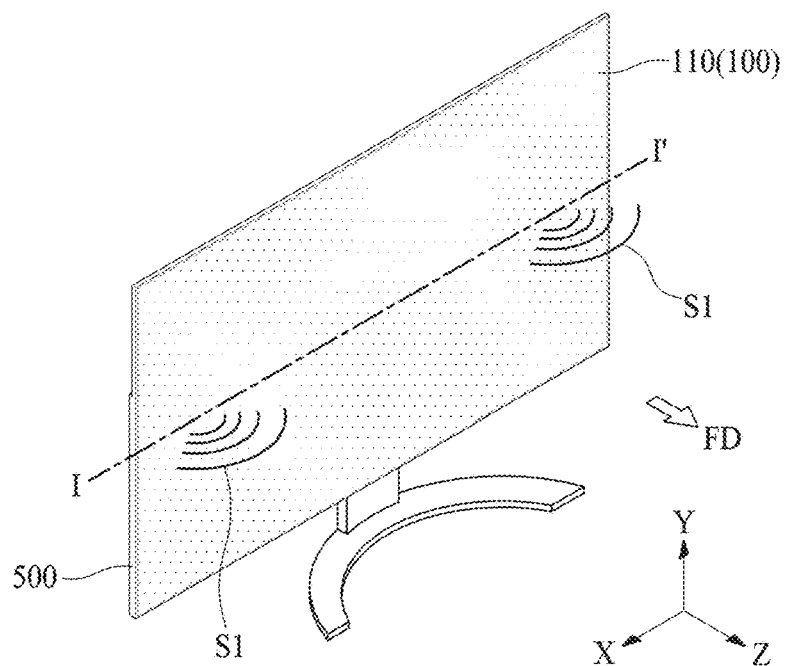
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of a display apparatus according to an embodiment of the present disclosure will be described in detail with reference to the accompanying drawings. In adding reference numerals to elements of each of the drawings, although the same elements are illustrated in other drawings, like reference numerals may refer to like elements. Also, for convenience of description, a scale of each of elements illustrated in the accompanying drawings differs from a real scale, and thus, is not limited to a scale illustrated in the drawings.

A display apparatus according to an embodiment of the present disclosure may include a vibration generating device (or a vibration generating apparatus). When the display apparatus is configured with a sound generating device which is the vibration generating device, there is a problem where it is difficult to secure a sound of a high-pitched sound band, due to complicated structures of the display apparatus. To solve the problem, the display apparatus according to an embodiment of the present disclosure may further include a piezoelectric vibration device including a piezoelectric material or a piezoelectric device having a piezoelectric effect (or an inverse piezoelectric characteristic) where an output of the high-pitched sound band is strong. When the piezoelectric vibration device is provided in the display apparatus for outputting a sound, the cost of the display apparatus increases, and a separate element for implementing a sound signal in the piezoelectric vibration device is needed, causing an increase in cost. Therefore, the inventors have performed various experiments for realizing a sound of the high-pitched sound band without configuring a piezoelectric vibration device in a display apparatus. Through the various experiments, the inventors have invented a display apparatus having a new structure. This will be described below.

Figure 2:
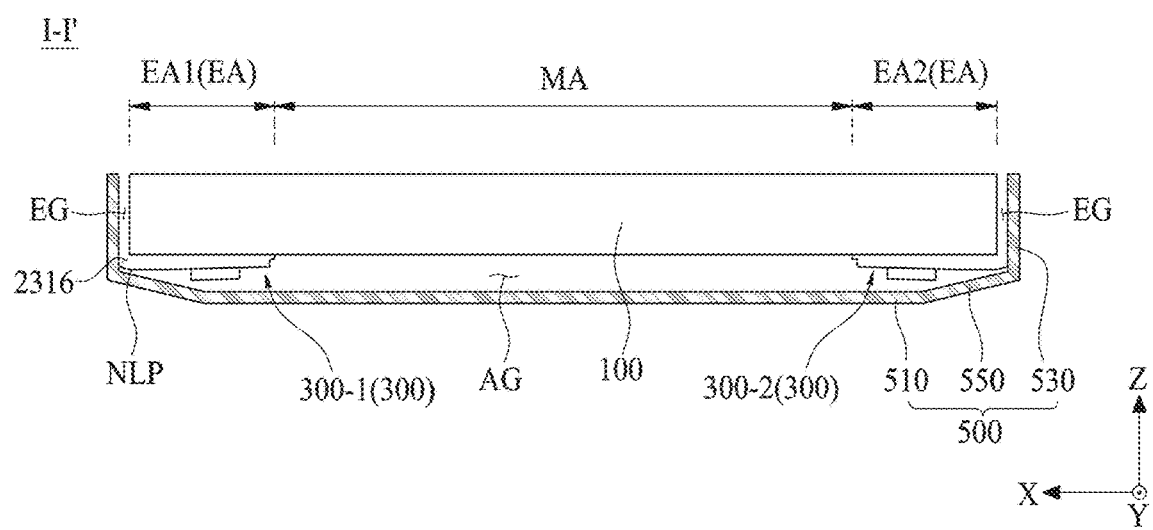
FIG. 2 is a cross-sectional view taken along line I-I' illustrated in FIG. 1.

FIG. 1 illustrates a display apparatus according to an embodiment of the present disclosure, and FIG. 2 is a cross-sectional view taken along line I-I' illustrated in FIG. 1.

With reference to FIGS. 1 and 2, the display apparatus according to an embodiment of the present disclosure may output a sound S1 based on a vibration of a display module 100 configured to display an image. For example, the image may include an electronic image or a digital image. For example, in the display apparatus, the display module 100 may be vibrated by a vibration generating device (or a sound generating device or a sound generator) to generate the sound S1. The sound S1 generated based on the vibration of the display module 100 may be outputted in a forward direction FD of a screen of the display apparatus. Therefore, the display apparatus according to an embodiment of the present disclosure may output the sound S1 in the forward direction FD of the screen of the display apparatus using the display module 100 as a vibration plate for generating a sound or for outputting a sound, and thus, may transfer the sounds, thereby improving sound quality and increasing an immersion experience of a viewer watching an image.

A display apparatus according to an embodiment of the present disclosure may include a display module 100 and a vibration generating device 300.

The display module 100 may be configured to display an image. The display module 100 may be configured to display an image and simultaneously to output a sound in response to a vibration of the vibration generating device 300. The display module 100 may be configured to output a sound in response to a vibration of the vibration generating device 300 in a state which does not display an image.

The display module 100 may be a liquid crystal display module, but embodiments of the present disclosure are not limited thereto. For example, the display module 100 may be a display module such as a light emitting display module, an electrophoretic display module, a micro light emitting diode display module, an electro-wetting display module, or a quantum dot light emitting display module.

The display module 100 according to an embodiment of the present disclosure may include a display panel configured to display an image. The display panel may be a liquid crystal display panel, but embodiments of the present disclosure are not limited thereto. For example, the display panel may be a display panel such as a light emitting display panel, an electrophoretic display panel, a micro light emitting diode display panel, an electro-wetting display panel, or a quantum dot light emitting display panel.

A rear surface (or a backside surface) of a display module 100 according to an embodiment of the present disclosure may include a middle region MA and a periphery region EA. For example, the rear surface of the display module 100 may be divided into the middle region (or a rear middle region or a middle region of the rear surface of the display module) MA and the periphery region (or a rear periphery region or a periphery region of the rear surface of the display module) EA.

The vibration generating device 300 may be provided on a rear surface (or a rear region or a rear surface region) of the display module 100. For example, the vibration generating device 300 may be disposed along a rear periphery region EA of the display module 100 (or a periphery region EA of the rear surface of the display module 100). The vibration generating device 300 may output a sound to the rear region of the display module 100, or may output a sound pressure level to the rear region of the display module 100. The vibration generating device 300 according to an embodiment of the present disclosure may vibrate based on a sound signal (or a voice signal) input from the outside to generate a sound and may output the generated sound in a forward direction FD and a lateral direction of the display module 100. For example, in response to the sound signal, the vibration generating device 300 may vibrate the rear periphery region EA of the display module 100 to generate a sound pressure level and may vibrate the rear periphery region EA of the display module 100 based on the generated sound pressure level to generate a sound S1. Also, a sound generated based on a vibration of the vibration generating device 300 may be reflected (or diffracted) in the lateral direction of the display module 100, and then, may be output in the forward direction FD of the display module 100. For example, a sound based on the sound pressure level output from the vibration generating device 300 may be output in the forward direction FD and the lateral direction of the display module 100.

According to an embodiment of the present disclosure, the vibration generating device 300 may include a nonlinear portion NLP and a sound emission port 2316. The nonlinear portion NLP may guide a sound, generated based on a sound signal, in a direction toward one side or a side surface of the display module 100. The sound emission port 2316 may be spaced apart from a rear surface of the display module 100. A sound, which is output from the vibration generating device 300 to the rear surface of the display module 100, may be guided in the direction toward the one side or the side surface of the display module 100 by the rear surface of the display module 100 and the nonlinear portion NLP and may be output in a lateral direction and a forward direction of the display module 100 through the sound emission port 2316. For example, the sound emission port 2316 may be a sound discharge part, a sound discharge port, a sound emission part, an acoustic emission port, an acoustic emission part, an acoustic emission portion, or a sound emission portion, but the terms are not limited thereto.

The vibration generating device 300 according to an embodiment of the present disclosure may include at least one vibration generating module 300-1 and 300-2 disposed along the rear periphery region EA of the display module 100. The vibration generating device 300 according to an embodiment of the present disclosure may include a first vibration generating module 300-1 and a second vibration generating module 300-2 disposed along the rear periphery region EA of the display module 100.

The first and second vibration generating modules 300-1 and 300-2 may be disposed to be symmetrical or asymmetrical with respect to a first direction X (or a widthwise direction) of the display module 100. For example, the first and second vibration generating modules 300-1 and 300-2 may be disposed to be symmetrical or asymmetrical with respect to a center of the display module 100 along the first direction X (or the widthwise direction) of the display module 100. For example, the first vibration generating module 300-1 may be disposed at a first rear periphery region (or a first periphery region) EA1 among the rear periphery region EA of the display module 100. The second vibration generating module 300-2 may be disposed at a second rear periphery region (or a second periphery region) EA2 among the rear periphery region EA of the display module 100. For example, when viewed from the forward direction of the display module 100, the first rear periphery region EA1 may be a left periphery region (or a right periphery region) of the rear surface of the display module 100, and the second rear periphery region EA2 may be a right periphery region (or a left periphery region) of the rear surface of the display module 100, but embodiments of the present disclosure are not limited thereto.

Each of the first and second vibration generating modules 300-1 and 300-2 may be configured to include a structure which includes the nonlinear portion NLP, covering a rear periphery region of the display module 100, and the sound emission port 2316 spaced apart from the rear surface of the display module 100. Each of the first and second vibration generating modules 300-1 and 300-2 may vibrate based on a sound signal to generate a sound, may output the sound to the rear surface of the display module 100, and output the sound in the lateral direction and the forward direction of the display module 100 through the nonlinear portion NLP and the sound emission port 2316 of the structure. For example, a sound generated by each of the first and second vibration generating modules 300-1 and 300-2 may be reflected (or diffracted) in the lateral direction of the display module 100, between each of the first and second vibration generating modules 300-1 and 300-2 and the rear surface of the display module 100 and between the nonlinear portion NLP and the rear surface of the display module 100, and may be output in the lateral direction and the forward direction of the display module 100 through the sound emission port 2316.

The display apparatus according to an embodiment of the present disclosure may further include a first supporting member 500 disposed at the rear surface of the display module 100.

The first supporting member 500 may include one or more of a plastic material, a metal material, or glass material, but embodiments of the present disclosure are not limited thereto. For example, the first supporting member 500 may be referred to as a rear cover, a system rear cover, a system housing, a set cover, a rear set cover, an outermost set cover, a product cover, or an outermost product cover, but embodiments of the present disclosure are not limited thereto.

The first supporting member 500 may be configured to accommodate the display module 100 where the vibration generating device 300 is disposed, or may be configured to cover a rear surface of the display module 100 where the vibration generating device 300 is disposed. Also, the first supporting member 500 may be configured to surround one or more side surfaces of the display module 100. For example, the first supporting member 500 may include a sound guide structure which guides a sound or a sound pressure level, generated based on a vibration of the vibration generating device 300, in a forward direction or a lateral direction of the display module 100.

The first supporting member 500 according to an embodiment of the present disclosure may include a first portion 510 and a second portion 530. The first portion 510 may be a rear cover portion or a cover portion of a rear surface. The second portion 530 may be a side cover portion or a cover portion of a side surface.

The first portion 510 may cover a rear surface (or a rear surface region) of the display module 100. The first portion 510 may be configured to cover some portion or the entire of the rear surface of the display module 100. For example, the first portion 510 may be spaced apart from the rear surface of the display module 100 by a predetermined interval (or distance). An air gap AG may be disposed between the first portion 510 and the rear surface of the display module 100. The air gap AG may be a first gap or a first space.

The second portion 530 may be connected to the first portion 510. The second portion 530 may be configured to surround at least one or more a side surface of the display module 100. The second portion 530 may be spaced apart from one side or the side surface of the display module 100 by a predetermined interval (or distance) so as not to directly contact the one side or the side surface of the display module 100. The second portion 530 may be a sound guide structure which is implemented to guide a sound or a sound pressure level, generated based on a vibration of the vibration generating device 300, in the forward direction FD of the display module 100. For example, the second portion 530 may be bent from the first portion 510 in a thickness direction Z of the display module 100. For example, the second portion 530 may be referred to as a sound guide or a sound guide member, but embodiments of the present disclosure are not limited thereto.

The first supporting member 500 according to an embodiment of the present disclosure may further include a third portion 550 between the first portion 510 and the second portion 530. The third portion 550 may be an inclined portion or a slope portion. The third portion 550 may be inclined or sloped in a direction from the first portion 510 to the second portion 530, in parallel with and/or overlapping the nonlinear portion NLP of the vibration generating device 300. For example, an angle between the first portion 510 and the third portion 550 may be 45 degrees or less, but embodiments of the present disclosure are not limited thereto. Therefore, the first supporting member 500 may include the third portion 550 which is in parallel with and/or overlaps the nonlinear portion NLP of the vibration generating device 300, and thus, a thickness of a periphery portion of the display apparatus overlapping the vibration generating device 300 may decrease.

The display apparatus according to an embodiment of the present disclosure may further include an edge gap EG implemented between the first supporting member 500 and the one side or the side surface of the display module 100. The edge gap EG may be a second gap, a second space, a border gap, a border space, or a sound space, but the terms are not limited thereto.

The edge gap EG may be configured between the one side or the side surface of the display module 100 and the second portion 530 of the first supporting member 500. The edge gap EG may communicate or be connected to the sound emission port 2316 configured at the vibration generating device 300. The edge gap EG may be about 1 mm to about 3 mm, but embodiments of the present disclosure are not limited thereto. For example, in the edge gap EG, a distance (or a shortest distance) between the second portion 530 of the first supporting member 500 and the one side or the side surface of the display module 100 may be about 1 mm to about 3 mm.

When the edge gap EG is greater than about 3 mm, a bezel width of the display apparatus may increase. The edge gap EG may be a sound emission space (or a sound outputting portion) where a sound, which is generated based on a vibration of the vibration generating device 300 and is output in a lateral direction of the display module 100, is output in the forward direction of the display module 100 through the sound emission port 2316 of the vibration generating device 300. For example, the sound generated based on the vibration of the vibration generating device 300 may be repeatedly reflected (or diffracted) between the rear surface of the display module 100 and the vibration generating device 300 and may be output toward the edge gap EG through the sound emission port 2316 of the vibration generating device 300.

The sound output toward the edge gap EG may be output in the forward direction of the display module 100 through the edge gap EG, or may be reflected (or diffracted) once or more between the one side or the side surface of the display module 100 and the second portion 530 of the first supporting member 500 and may be output in the forward direction of the display module 100. For example, the sound output through the edge gap EG may be referred to as an edge sound, a border sound, a periphery sound, or a reinforcement sound, but embodiments of the present disclosure are not limited thereto.

Therefore, the display apparatus according to an embodiment of the present disclosure may output a sound S1 based on a vibration of the display module 100 based on a sound which is output from the vibration generating device 300 disposed at the rear periphery region (or the periphery region of the rear surface) EA of the display module 100. In the display apparatus according to an embodiment of the present disclosure, at least a portion of a sound of a high-pitched sound band in sounds output from the vibration generating device 300 may be reflected (or diffracted) in the lateral direction of the display module 100 by the nonlinear portion NLP of the vibration generating device 300, and may be output in the forward direction FD of the display module 100 through the sound emission port 2316 of the vibration generating device 300 and the edge gap EG. Accordingly, in the display apparatus according to an embodiment of the present disclosure, a sound characteristic of the high-pitched sound band may be enhanced based on a sound which is output in the forward direction FD of the display module 100 through the edge gap EG.

Figure 3:
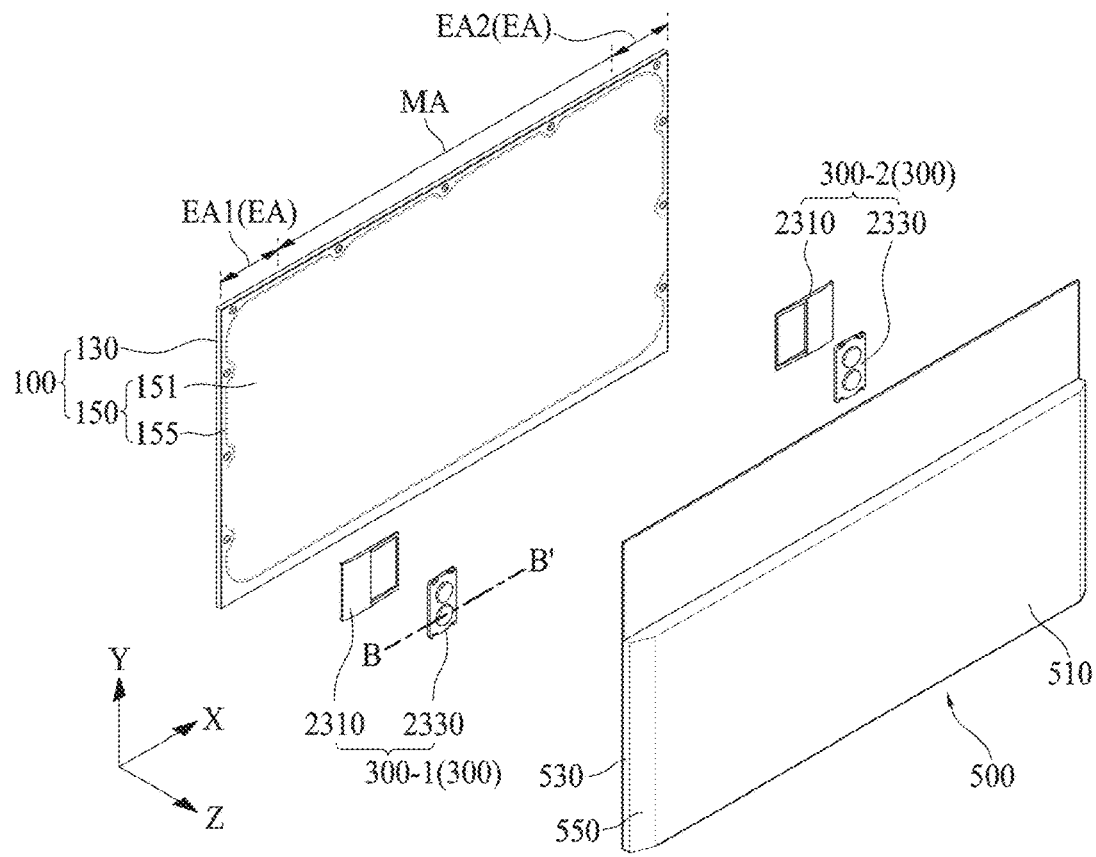
FIG. 3 is an exploded view of a display apparatus according to an embodiment of the present disclosure.
Figure 4:
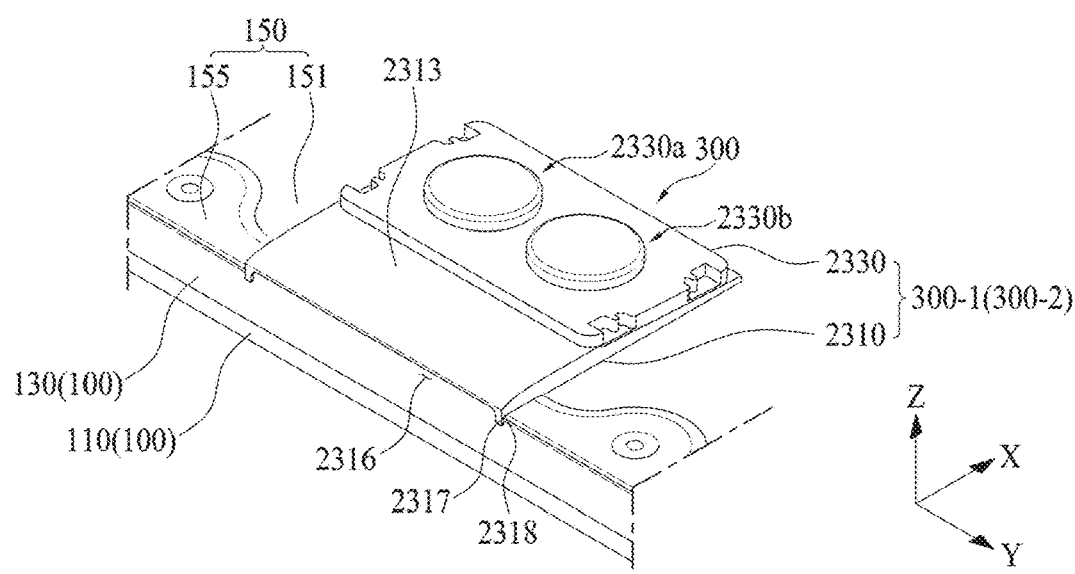
FIG. 4 illustrates a vibration generating device disposed at a second supporting member illustrated in FIG. 3.
Figure 5:
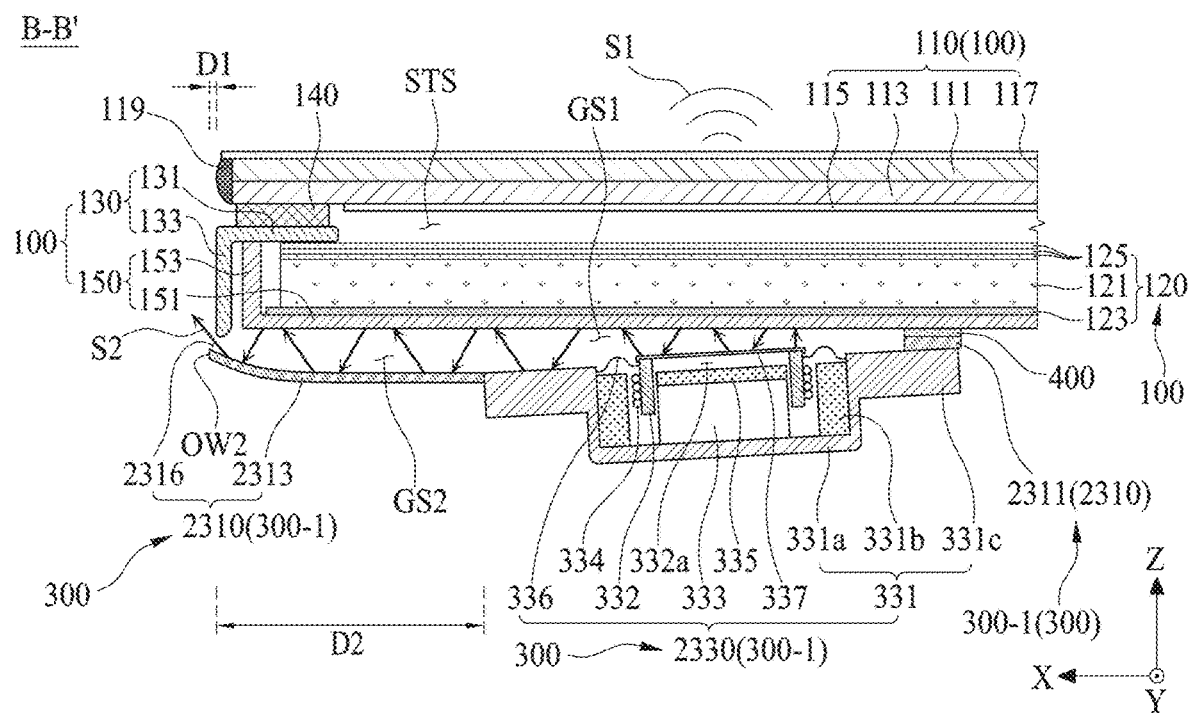
FIG. 5 is a cross-sectional view taken along line B-B' illustrated in FIG. 3.

FIG. 3 is an exploded view of a display apparatus according to an embodiment of the present disclosure, FIG. 4 illustrates a vibration generating device disposed at a second supporting member illustrated in FIG. 3, and FIG. 5 is a cross-sectional view taken along line B-B' illustrated in FIG. 3.

With reference to FIGS. 3 to 5, in the display apparatus according to an embodiment of the present disclosure, a display module 100 may include a display panel 110, a panel guide 130, and a second supporting member 150.

The display panel 110 may be a liquid crystal display panel, but embodiments of the present disclosure are not limited thereto. For example, the display panel 110 may be a display panel such as an organic light emitting display panel, a light emitting display panel, an electrophoretic display panel, a micro light emitting diode display panel, an electro-wetting display panel, or a quantum dot light emitting display panel.

When the display panel 110 may be a liquid crystal display panel, the display module 100 may further include a backlight part 120 disposed between the display panel 110 and the second supporting member 150.

The display panel 110 according to an embodiment of the present disclosure may include a first substrate 111, a second substrate 113, a first polarization member 117, and a second polarization member 115.

The first substrate 111 may be an upper substrate or a thin film transistor (TFT) array substrate and may include a pixel array (or a display part or a display area) including a plurality of pixels which are respectively provided at a plurality of pixel areas formed at intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The first substrate 111 may further include a pad part provided at a first periphery (or a first non-display part) thereof and a gate driving circuit provided at a second periphery (or a second non-display part) thereof.

The pad part may transfer a signal, supplied from the outside, to the pixel array and/or the gate driving circuit. For example, the pad part may include a plurality of data pads connected to a plurality of data lines through a plurality of data link lines and a plurality of gate input pads connected to the gate driving circuit through gate control signal lines. For example, a first periphery of the first substrate 111 including the pad part may protrude to or beyond a side surface corresponding to a first periphery of the lower substrate 113, and the pad part may be exposed in a rearward direction toward the second supporting member 150. For example, a size of the first substrate 111 may be greater than that of the lower substrate 113, but embodiments of the present disclosure are not limited thereto.

The gate driving circuit according to an embodiment of the present disclosure may be embedded (or integrated) into a second periphery of the first substrate 111 and may be connected to the plurality of gate lines. For example, the gate driving circuit may be implemented with a shift register including a transistor, which is formed through the same process as the TFT provided in the pixel area. According to another embodiment of the present disclosure, the gate driving circuit may be implemented as an integrated circuit (IC) and may be included in a panel driving circuit, without being embedded into the first substrate 111.

The second substrate 113 may be a lower substrate or a color filter array substrate and may include a pixel pattern, including an opening area overlapping the pixel area formed in the first substrate 111, and a color filter layer formed in the opening area. The second substrate 113 according to an embodiment of the present disclosure may have a size which is smaller than that of the first substrate 111, but embodiments of the present disclosure are not limited thereto. For example, the second substrate 113 may overlap a portion other than the first periphery, of the first substrate 111. The second substrate 113 may be bonded or attached to a portion other than the first periphery, of the first substrate 111 with a liquid crystal layer therebetween by a sealant.

The liquid crystal layer may be interposed between the first substrate 111 and the second substrate 113 and may include a liquid crystal including liquid crystal molecules where an alignment direction thereof is changed based on an electric field generated by the common voltage and a data voltage applied to a pixel electrode for each pixel.

The second polarization member 115 may be a lower polarization member and may be attached on a lower surface of the second substrate 113 and may polarize light which is incident from the backlight part 120 and travels to the liquid crystal layer.

The first polarization member 117 may be an upper polarization member and may be attached on an upper surface of the first substrate 111 and may polarize light which passes through the first substrate 111 and is output to the outside.

The display panel 110 according to an embodiment of the present disclosure may drive the liquid crystal layer based on an electric field which is generated in each pixel by the data voltage and the common voltage applied to each pixel, and thus, may display an image based on light passing through the liquid crystal layer.

In the display panel 110 according to an embodiment of the present disclosure, the first substrate 111 implemented as the TFT array substrate may configure an image display surface, and thus, a whole front surface of the display panel 110 may be exposed at the outside without being covered by a separate mechanism.

According to another embodiment of the present disclosure, in the display panel 110, the first substrate 111 may be implemented as the color filter array substrate, and the second substrate 113 may be implemented as the TFT array substrate. For example, the display panel 110 according to another embodiment of the present disclosure may have a type where an upper portion and a lower portion of the display panel 110 according to an embodiment of the present disclosure are reversed therebetween. For example, a pad part of the display panel 110 according to another embodiment of the present disclosure may be covered by a separate mechanism or structure.

The display module 100 according to an embodiment of the present disclosure may further include a buffer member 119. The buffer member 119 may be formed to surround at least one or more of side surfaces of the display panel 110. For example, the buffer member 119 may be formed to cover each side surface and each corner of the display panel 110. The buffer member 119 may protect the side surfaces of the display panel 110 from an external impact, or may prevent light leakage through the side surfaces of the display panel 110. The buffer member 119 according to an embodiment of the present disclosure may include a silicone-based sealant or ultraviolet (UV)-curable sealant (or resin). For example, the buffer member 119 may include a colored resin or a light blocking resin for preventing light leakage through a side surface.

A portion of an upper surface of the buffer member 119 according to an embodiment of the present disclosure may be covered by the first polarization member 117. An attachment surface between the buffer member 119 and the first substrate 111 or a boundary portion between the buffer member 119 and the first substrate 111 may be concealed by an extension portion of the first polarization member 117, and thus, may not be exposed in a forward portion of the display apparatus. The front surface of the display panel 110 may not be covered by a separate mechanism and may be exposed in the forward portion of the display apparatus, and due to this, when the buffer member 119 is not provided, the light leakage at the side surface of the display panel 110 may occur. Therefore, in a display apparatus having a structure where the front surface or the whole front surface of the display panel 110 is exposed in the forward portion so as to remove or minimize a bezel width of the display apparatus, the buffer member 119 may be configured to prevent the side light leakage at the side surface of the display panel 110 and to protect the surfaces of the display panel 110. But embodiments of the present disclosure are not limited thereto, and the buffer member 119 may be omitted.

The backlight part 120 may be disposed at the rear surface of the display panel 110 and may irradiate light onto the rear surface of the display panel 110. The backlight part 120 according to an embodiment of the present disclosure may include a light guide plate 121, a light source part, a reflective sheet 123, and an optical sheet part 125.

The light guide plate (or a light guide member) 121 may be disposed on the second supporting member 150 to overlap the display panel 110 and may include a light incident surface provided at at least one side thereof. The light guide plate 121 may include a light-transmitting plastic or glass material. The light guide plate 121 may travel (or output) light, which is incident through the light incident surface from the light source part, to the display panel 110. For example, the light guide plate 121 may be referred to as a light guide member or a flat or plane light source, but embodiments of the present disclosure are not limited thereto.

The light source part may irradiate light onto the light incident surface provided in the light guide plate 121. The light source part may be disposed at the second supporting member 150 to overlap a first periphery of the display panel 110. The light source part according to an embodiment of the present disclosure may include a plurality of light emitting diodes which are mounted on a light-source printed circuit board (PCB) and irradiate lights onto the light incident surface of the light guide plate 121.

The reflective sheet 123 may be disposed at the second supporting member 150 to cover a rear surface of the light guide plate 121. The reflective sheet 123 may reflect light, which is incident from the light guide plate 121, to the light guide plate 121 to reduce or minimize the loss of the light.

The optical sheet part 125 may be disposed on a front surface of the light guide plate 121 and may enhance a luminance characteristic of light output from the light guide plate 121. The optical sheet part 125 according to an embodiment of the present disclosure may include a diffusion sheet, a first prism sheet, and a second prism sheet. For example, the optical sheet part 125 may be configured as one layer including the diffusion sheet, the first prism sheet, and the second prism sheet. But embodiments of the present disclosure are not limited thereto. For example, the optical sheet part 125 may be configured by a stacked combination of one or more sheets among a diffusion sheet, a prism sheet, a dual brightness enhancement film, and a lenticular sheet, or may be configured with one composite sheet having a light diffusing function and a light collecting function.

The panel guide (or panel supporting part) 130 may be disposed at a rear periphery region EA of the display panel 110. The panel guide 130 may support a rear periphery region EA of the display panel 110. The panel guide 130 may be supported at or accommodated into the second supporting member 150 to overlap the rear periphery region EA of the display panel 110. The panel guide 130 may be disposed under the rear periphery region EA of the display panel 110 not to protrude to the outside of each side surface of the display panel 110.

The panel guide 130 according to an embodiment of the present disclosure may include a guide frame (or panel supporting frame) 131 and a guide side portion (or a guide sidewall) 133. For example, the panel guide 130 may have a cross-sectional structure having a ]-shape or a ¬-shape based on a coupling or connection structure of the guide frame 131 and the guide side portion 133, but embodiments of the present disclosure are not limited thereto.

The guide frame 131 may be coupled or connected to the rear periphery region (or the periphery region of the rear surface) EA of the display panel 110 and may be supported at the second supporting member 150. For example, the guide frame 131 may have a tetragonal band (or perimeter or belt) shape including an opening portion overlapping a middle region MA, other than the rear periphery region EA, of the display panel 110, but embodiments of the present disclosure are not limited thereto. The guide frame 131 may have a size equal to or smaller than that of the display panel 110 not to protrude to the outside of each side surface of the display panel 110. For example, the opening portion of the guide frame 131 may have a size which is equal to or greater than that of the pixel array (or the display portion) provided in the display panel 110.

The guide frame 131 may directly contact an uppermost surface of the backlight part 120 (for example, an uppermost surface of the optical sheet part 125), or may be spaced apart from the uppermost surface of the optical sheet part 125 by a certain distance.

The guide side portion 133 may be connected to the guide frame 131 and may surround one side (or portion) or the side surface of the second supporting member 150. For example, the guide side portion 133 may be bent from the guide frame 131 to the side surfaces of the second supporting member 150 and may surround the side surfaces of the second supporting member 150 or may be surrounded by the side surfaces of the second supporting member 150. The guide side portion 133 may be surrounded by the first supporting member 500. For example, the guide side portion 133 may be surrounded by the second portion 530 of the first supporting member 500.

The panel guide 130 according to an embodiment of the present disclosure may include a plastic material, a metal material, or a mixed material of a plastic material and a metal material, but embodiments of the present disclosure are not limited thereto. For example, the panel guide 130 may act as a vibration transfer member which transfers a sound vibration, generated by the vibration generating device 300, to the rear periphery region EA of the display panel 110. Therefore, the panel guide 130 may transfer the sound vibration, generated by the vibration generating device 300, to the display panel 110 without being lost in a state of maintaining stiffness of the display panel 110. For example, the panel guide 130 may include a metal material for transferring the sound vibration, generated by the vibration generating device 300, to the display panel 110 without being lost of the sound vibration in a state of maintaining stiffness of the display panel 110, but embodiments of the present disclosure are not limited thereto.

The panel guide 130 according to an embodiment of the present disclosure may be disposed at the rear periphery region EA of the display panel 110. The panel guide 130 may be coupled or connected to the rear periphery region EA of the display panel 110 by a first connection member 140.

The first connection member 140 may be disposed between the rear periphery region EA of the display panel 110 and the guide frame 131 of the panel guide 130 and may dispose or couple the display panel 110 at the panel guide 130. The first connection member 140 of the embodiment of the present disclosure may include an acryl-based adhesive member or a urethane-based adhesive member, but embodiments of the present disclosure are not limited thereto. For example, the first connection member 140 may include the acryl-based adhesive member which is relatively better in adhesive force and hardness than the urethane-based adhesive member so that the vibration of the panel guide 130 can be well transferred to the display panel 110. For example, the first connection member 140 may include a double-sided foam adhesive pad having an acryl-based adhesive layer, or an acryl-based adhesive resin curing layer.

A front surface of the first connection member 140 according to an embodiment of the present disclosure may be coupled or connected at the second substrate 113 or the second polarization member 115 of the display panel 110. The first connection member 140 may be directly coupled or connected to a rear periphery region EA of the second substrate 113 to enhance an adhesive force between the first connection member 140 and the display panel 110. For example, the first connection member 140 may be attached on the rear periphery region EA of the second substrate 113 and may surround a side surface of the second polarization member 115, thereby preventing light leakage of the side surface from occurring in the second polarization member 115.

The first connection member 140 may have a certain thickness (or height). So, the first connection member 140 may provide a sound transfer space STS between the display panel 110 and the backlight part 120. The first connection member 140 according to an embodiment of the present disclosure may be provided at a four-side-closed shape or a closed loop shape at the guide frame 131 of the panel guide 130, but embodiments of the present disclosure are not limited thereto. For example, the first connection member 140 may provide the closed sound transfer space STS between a rearmost surface of the display panel 110 and an uppermost surface of the backlight part 120 which face each other with the opening portion of the panel guide 130 therebetween, thereby preventing or minimizing the leakage (or loss) of a sound pressure transferred to the sound transfer space STS. The sound transfer space STS may also act as a sound pressure generating space where a sound pressure level is generated based on a vibration of the backlight part 120 or a panel vibration space which enables a vibration of the display panel 110 to be smoothly performed.

The second supporting member 150 may be disposed at the rear surface of the display module 100. The second supporting member 150 may be configured to be disposed at a rearmost surface of the display module 100. Also, the second supporting member 150 may support the panel guide 130 and may support the backlight part 120. Also, the second supporting member 150 may support the vibration generating device 300. For example, the second supporting member 150 may be a supporting cover, a supporting member, a bottom cover, a cover bottom, an inner cover, or an internal structure.

The second supporting member 150 according to an embodiment of the present disclosure may act as a vibration plate. For example, the second supporting member 150 may include a metal material, a metal alloy material, or a non-ferrous metal material, but embodiments of the present disclosure are not limited thereto.

According to an embodiment of the present disclosure, the second supporting member 150 may include one or more material among an iron (Fe), an aluminum (Al), a magnesium (Mg), a Mg alloy, a magnesium and lithium alloy, an Al alloy, and an electroplating steel, but embodiments of the present disclosure are not limited thereto. For example, the electroplating steel may be electrolytically galvanized steel sheet, electrogalvanized coil, or electrogalvanized iron.

According to an embodiment of the present disclosure, when the second supporting member 150 includes a material including nonferrous metal, a sound of a low-pitched sound band of the vibration generating device 300 may be more enhanced. For example, when the second supporting member 150 includes ferrous metal, the loss of a vibration may occur due to a magnetic field of the vibration generating device 300, and thus, a sound characteristic of the vibration generating device 300 may be reduced. For example, the low-pitched sound band may be 200 Hz or less, but embodiments of the present disclosure are not limited thereto.

The second supporting member 150 according to an embodiment of the present disclosure may include a first portion 151, which implements the rear surface of the display module 100, and a second portion 153 disposed at a periphery region of the first portion 151. The second portion 153 may support the panel guide 130.

The first portion 151 may be disposed at a rear surface of the backlight part 120 of the display module 100. The first portion 151 may be disposed to cover the rear surface of the backlight part 120 of the display module 100. The first portion 151 may support the backlight part 120. The first portion 151 may be configured to include a plate structure. The first portion 151 may support the backlight part 120 of the display module 100 and may support the vibration generating device 300. For example, the first portion 151 may contact (or directly contact) a rear surface of the reflective sheet 123, and thus, may transfer a sound vibration, generated based on a vibration of the vibration generating device 300, to the reflective sheet 123 of the backlight part 120.

The first portion 151 may include a middle region MA, corresponding to (overlapping) a middle region of the display module 100, and a periphery region EA corresponding to (overlapping) the rear periphery region EA of the display module 100. For example, the first portion 151 may be referred to as a bottom portion, a lower portion, a rear portion, a supporting plate, a flat plate, a plate structure, or a cover plate, but embodiments of the present disclosure are not limited thereto.

The second portion 153 may be bent from a periphery of the first portion 151 and may support the panel guide 130. The second portion 153 may provide a backlight accommodation space on the first portion 151 and may surround one or more of side surfaces of the backlight part 120 accommodated into (or supported at) the backlight accommodation space. The second portion 153 may transfer a sound vibration, generated in the first portion 151 by the vibration generating device 300, to the panel guide 130. For example, the second portion 153 may be referred to as a side portion, a side surface portion, a sidewall portion, a supporting sidewall, a sidewall structure, or a cover sidewall, but embodiments of the present disclosure are not limited thereto.

The second portion 153 may be surrounded by the panel guide 130. For example, the second portion 153 may be surrounded by a guide side portion 133 of the panel guide 130.

The second supporting member 150 according to an embodiment of the present disclosure may further include a third portion 155. The third portion 155 may reinforce the stiffness of the second supporting member 150 and thus may be a reinforcement portion or a stiffness reinforcement portion, but embodiments of the present disclosure are not limited thereto.

The third portion 155 according to an embodiment of the present disclosure may be disposed between the first portion 151 and the second portion 153. For example, the third portion 155 may be provided in a region (or a connection region) where the first portion 151 intersects with the second portion 153. For example, the third portion 155 may be provided along a periphery region EA of the first portion 151. For example, the third portion 155 may protrude in a rearward direction to include an inclined surface which is inclined from one side or an end of the first portion 151. When the second supporting member 150 includes the third portion 155, the second portion 153 may be connected to one side of the third portion 155. For example, the second portion 153 may be connected to an end of the third portion 155.

According to another embodiment of the present disclosure, the first portion 151 of the second supporting member 150 may include a cross-sectional structure having a concavely curved shape. The second supporting member 150 may support the backlight part 120 and the panel guide 130 in a curved shape which is concavely bent. The display panel 110 may be bent in a concavely curved shape and may be supported at the panel guide 130. Therefore, when the first portion 151 of the second supporting member 150 has a cross-sectional structure having a concavely curved shape, an internal air gap may be provided between the light guide plate 121 and the reflective sheet 123 of the backlight part 120 and may act as a sound box. Accordingly, a sound characteristic of a low-pitched sound band which is generated in the display module 100 based on a vibration of the vibration generating device 300 may be enhanced. For example, the second supporting member 150 including a cross-sectional structure having a concavely curved shape may be applied to a curved display apparatus.

The vibration generating device 300 according to an embodiment of the present disclosure may include first and second vibration generating modules 300-1 and 300-2 which are disposed at a rear region of the display module 100.

The first vibration generating module 300-1 may be disposed at a first rear periphery region (or a first periphery region) EA1 of the display module 100. For example, the first vibration generating module 300-1 may be disposed at (or coupled to) a first rear periphery region EA1 of the second supporting member 150 which corresponds to (or overlaps) the first rear periphery region EA1 of the display module 100.

The first vibration generating module 300-1 may be configured to vibrate based on a sound signal to output a sound (or a sound wave) to a first rear periphery region EA1 (or a left periphery region) among the periphery region EA of the display module 100. A sound generated by the first vibration generating module 300-1 may be propagated (or transferred) to the first rear periphery region EA1 among the periphery region EA of the display module 100 to vibrate the first rear periphery region EA1 of the display module 100, and thus, may generate a sound S1 which is output to a forward portion of the display module 100. Also, at least a portion S2 of a sound having a high-pitched sound band among sounds generated by the first vibration generating module 300-1 may be reflected (or diffracted) in the lateral direction of the display module 100 in a space between the first rear periphery region EA1 of the display module 100 and the first vibration generating module 300-1 and may be output in the forward direction of the display module 100. For example, the first vibration generating module 300-1 may realize a left sound (or a first sound) of the display apparatus, but embodiments of the present disclosure are not limited thereto.

The second vibration generating module 300-2 may be disposed at a second rear periphery region EA2 of the display module 100. For example, the second vibration generating module 300-2 may be disposed at (or coupled to) a second rear periphery region EA2 of the second supporting member 150 which corresponds to (or overlaps) the second rear periphery region EA2 of the display module 100.

The second vibration generating module 300-2 may be configured to vibrate based on a sound signal to output a sound (or a sound wave) to a second rear periphery region EA2 (or a right periphery region) among the periphery region EA of the display module 100. A sound generated by the second vibration generating module 300-2 may be propagated (or transferred) to the second rear periphery region EA2 among the periphery region EA of the display module 100 to vibrate the second rear periphery region EA2 of the display module 100, and thus, may generate a sound S1 which is output to the forward portion of the display module 100. Also, at least a portion S2 of a sound having a high-pitched sound band among sounds generated by the second vibration generating module 300-2 may be reflected (or diffracted) in the lateral direction of the display module 100 in a space between the second rear periphery region EA2 of the display module 100 and the second vibration generating module 300-2 and may be output in the forward direction of the display module 100. For example, the second vibration generating module 300-2 may realize a right sound (or a second sound) of the display apparatus, but embodiments of the present disclosure are not limited thereto.

Each of the first and second vibration generating modules 300-1 and 300-2 may include a structure 2310 and a vibration generator 2330.

The structure 2310 may be disposed at a rear surface of the display module 100 and may be configured to output a sound, output from the vibration generator 2330, in the lateral direction of the display module 100.

The structure 2310 according to an embodiment of the present disclosure may be referred to as a sound emission supporter, an acoustic emission supporter, a sound guide frame, a sound emission guide frame, an acoustic emission guide frame, or a sound supporting frame, but embodiments of the present disclosure are not limited thereto.

The structure 2310 may be disposed at the rear periphery region EA of the display module 100 and may support the vibration generator 2330. For example, the structure 2310 may be disposed at the rear periphery region EA of the second supporting member 150.

The structure 2310 according to an embodiment of the present disclosure may be disposed at the rear periphery region EA of the display module 100. For example, the structure 2310 may be supported at (or connected to) the rear periphery region EA of the display module 100 by using the second connection member 400. For example, the structure 2310 may be supported aat (or connected to) a rear periphery region EA of the first portion 151 of the second supporting member 150 by the second connection member 400.

The second connection member 400 may be disposed between the first portion 151 of the second supporting member 150 and the structure 2310. The second connection member 400 may dispose or couple the structure 2310 to the first portion 151 of the second supporting member 150. The second connection member 400 may include a double-sided tape, a double-sided foam tape, a double-sided foam pad, or a double-sided foam pad tape, which includes an adhesive resin or an adhesive layer, but embodiments of the present disclosure are not limited thereto. The adhesive resin or the adhesive layer of the second connection member 400 according to an embodiment of the present disclosure may include an acryl-based or a urethane-based adhesive material, but embodiments of the present disclosure are not limited thereto. For example, the adhesive resin or the adhesive layer of the second connection member 400 may include the urethane-based adhesive material having a relatively ductile characteristic compared to the acryl-based adhesive material having a characteristic which is relatively high in hardness, for preventing or minimizing the transfer of a vibration of the display module 100 to the structure 2310.

The second connection member 400 may be configured to include an opening portion or an open region, for solving a problem where a sound generated by the vibration generating device 300 is trapped between the second supporting member 150 and the structure 2310 and thus is not output. For example, the second connection member 400 may include a side surface including an opening portion or an open region. For example, the second connection member 400 may have a structure where a side surface thereof is open. For example, a sound generated by the vibration generator 2330 may pass through one side surface of the second connection member 400 and may be output in the lateral direction of the display module 100, and thus, a problem where a sound of a high-pitched sound band is not output may be solved, thereby enhancing a sound characteristic of the high-pitched sound band of a display apparatus. For example, the high-pitched sound band may be 3 kHz or more, but embodiments of the present disclosure are not limited thereto and may be 5 kHz or more.

The structure 2310 of the first vibration generating module 300-1 may be disposed at (or coupled to) the first rear periphery region EA1 of the second supporting member 150. The structure 2310 of the second vibration generating module 300-2 may be disposed at (or coupled to) the second rear periphery region EA2 of the second supporting member 150. For example, the structure 2310 of the first vibration generating module 300-1 may be a first structure or a first sound structure, and the structure 2310 of the second vibration generating module 300-2 may be a second structure or a second sound structure.

The structure 2310 may provide a first gap space GS1 between the rear surface of the display module 100 and the vibration generator 2330. For example, the structure 2310 may provide the first gap space GS1 between the rear periphery region EA of the second supporting member 150 and the vibration generator 2330. The first gap space GS1 may be referred to as a sound generating space, a sound pressure space, a sound emission space, an acoustic emission space, or a sound box, but embodiments of the present disclosure are not limited thereto.

The structure 2310 may support the vibration generator 2330. A portion of a sound S2 generated by the vibration generator 2330 may be repeatedly reflected (or diffracted) in the first gap space GS1 and may be output in the lateral direction of the display module 100. For example, the structure 2310 may be disposed so that the vibration generator 2330 is nonparallel to the rear surface of the display module 100 or a rear surface of the second supporting member 150. For example, the structure 2310 may support the vibration generator 2330 so that the vibration generator 2330 is nonparallel to the rear surface of the display module 100 or the rear surface of the second supporting member 150. For example, the structure 2310 may support the vibration generator 2330 so that the vibration generator 2330 is inclined from the rear surface of the display module 100.

The structure 2310 may include the nonlinear portion NLP and the sound emission port 2316. The nonlinear portion NLP may cover a rear periphery region of the display module 100. The sound emission port 2316 may be spaced apart from the rear surface of the display module 100. The structure 2310 according to an embodiment of the present disclosure may include a supporting portion 2311, and a sound guide portion 2313.

The supporting portion 2311 may be disposed at the rear surface of the display module 100. For example, the supporting portion 2311 may be disposed between the rear surface of the display module 100 and the vibration generating device 300. The supporting portion 2311 may be configured to support the vibration generator 2330. The supporting portion 2311 according to an embodiment of the present disclosure may include a supporting surface (or an inclined slope surface or an oblique surface) which is inclined to be nonparallel to a rear surface of the second supporting member 150, and thus, may support the vibration generator 2330 so as to be inclined from the rear surface of the display module 100.

The supporting surface (or the inclined surface) of the supporting portion 2311 may be inclined or sloped by an angle of five degrees or less with respect to a rear surface of the second supporting member 150, but embodiments of the present disclosure are not limited thereto. Therefore, the supporting surface (or the inclined surface) of the supporting portion 2311 may support the vibration generator 2330 so as to be nonparallel to the rear surface of the display module 100 or the rear surface of the second supporting member 150.

The supporting portion 2311 may include an opening portion or an opening. For example, the supporting portion 2311 may include an opening portion or an opening which overlaps the vibration generator 2330. For example, the opening portion of the supporting portion 2311 may be configured to overlap a region, other than a periphery region, of the vibration generator 2330. The sound guide portion 2313 may extend from the supporting portion 2311 to one side (or one portion) of the display module 100. For example, the sound guide portion 2313 may extend from the supporting portion 2311 to a side surface (or a lateral surface) of the display module 100 along a first direction X to cover a rear periphery region EA of the display module 100. The sound guide portion 2313 may be configured to include the nonlinear portion NLP. The sound guide portion 2313 may guide a portion of a sound S2, generated based on a vibration of the vibration generator 2330 supported at the supporting portion 2311 through the nonlinear portion NLP, in a lateral direction of the display module 100. For example, some portion of the sound S2 generated based on the vibration of the vibration generator 2330 may be reflected (or diffracted) in a second gap space GS2 between the rear surface of the display module 100 and the nonlinear portion NLP and may travel in the lateral direction of the display module 100.

The nonlinear portion NLP may be configured to cover the rear periphery region EA of the display module 100 disposed between the rear surface of the display module 100 and the vibration generator 2330. The nonlinear portion NLP may guide a sound, reflected (or diffracted) in the first gap space GS1, in the lateral direction of the display module 100 or a direction toward the sound emission port 2316. For example, a portion of the sound S2 generated based on the vibration of the vibration generator 2330 may be reflected (or diffracted) in the second gap space GS2 between the rear surface of the display module 100 and the nonlinear portion NLP and may travel in the lateral direction of the display module 100 or a direction toward the sound emission port 2316.

The nonlinear portion NLP according to an embodiment of the present disclosure may be configured to include a cross-sectional structure having a curved shape. For example, the nonlinear portion NLP may include a cross-sectional structure which is bent in a curved shape (or a bent shape) between one side thereof adjacent to the vibration generator 2330 and the other side thereof adjacent to one side or the side surface of the display module 100.

According to an embodiment of the present disclosure, a distance between the rear surface of the display module 100 and the nonlinear portion NLP may decrease progressively toward the one side or the side surface of the display module 100 along the first direction X. According to an embodiment of the present disclosure, the nonlinear portion NLP may include a plurality of curved portions having different curvature radiuses. The curvature radius of each of the plurality of curved portions may decrease progressively toward the one side of the display module 100. For example, the curvature radius of each of the plurality of curved portions may be smaller as it is closer to the side surface of the display module 100. For example, a curvature radius of a curved portion adjacent to the vibration generator 2330 among the plurality of curved portions may be largest, and a curvature radius of a curved portion adjacent to the one side or the side surface of the display module 100 among the plurality of curved portions may be smallest.

The sound emission port 2316 may be disposed between one side of the nonlinear portion NLP and the rear surface of the display module 100. For example, the sound emission port 2316 may be disposed between an end of the nonlinear portion NLP and the rear surface of the display module 100. For example, the sound emission port 2316 may include a slit or a slot shape which extends along a second direction Y between the end of the nonlinear portion NLP and the display module 100, but embodiments of the present disclosure are not limited thereto. The sound emission port 2316 may output the sound S2, reflected (or diffracted) in the second gap space GS2 between the rear surface of the display module 100 and the nonlinear portion NLP, in the lateral direction of the display module 100 or to the edge gap EG (see FIG. 2) of the display module 100.

The vibration generator 2330 of each of the first and second vibration generating modules 300-1 and 300-2 may be disposed at a corresponding structure 2310. For example, the vibration generator 2330 of each of the first and second vibration generating modules 300-1 and 300-2 may be configured to be supported at (or coupled to) the corresponding structure 2310.

The vibration generator 2330 according to an embodiment of the present disclosure may be disposed or coupled to the structure 2310 so as to be nonparallel to a rear region of the display module 100. For example, the vibration generator 2330 may be disposed to be nonparallel to the rear region of the second supporting member 150. For example, the vibration generator 2330 may be disposed or coupled to the structure 2310 so as to be nonparallel to a rear region of the second supporting member 150. For example, a distance (or a shortest distance) between the rear region of the second supporting member 150 and the vibration generator 2330 may increase progressively toward the side surface (or lateral surface) of the display module 100 along the first direction X.

The vibration generator 2330 according to an embodiment of the present disclosure may be disposed or coupled to the structure 2310 and may vibrate based on a sound signal to output a sound pressure level or a sound to the display module 100. For example, the vibration generator 2330 may vibrate based on a sound signal in a state which is sloped or inclined with respect to a rear region of the second supporting member 150, and thus, may generate a sound pressure level or may output a sound at the first gap space GS1 between the rear surface of the second supporting member 150 and the structure 2310. Therefore, the sound output from the vibration generator 2330 inclined with respect to the rear region of the second supporting member 150 may be repeatedly reflected (or diffracted) in the first gap space GS1 between the rear surface of the second supporting member 150 and the structure 2310 and may travel in the lateral direction of the display module 100. Accordingly, the sound based on the sound pressure level output from the vibration generator 2330 may be output in the forward direction and the lateral direction of the display module 100. For example, at least a portion of a sound of the high-pitched sound band among sounds generated by the vibration generator 2330 may be repeatedly reflected (or diffracted) in the first gap space GS1 and may be output in the lateral direction of the display module 100 through one side surface of the second connection member 400 and the sound emission port 2316, thereby enhancing a sound characteristic of the high-pitched sound band of a display apparatus.

The vibration generator 2330 may include a sound actuator or a sound exciter, but embodiments of the present disclosure are not limited thereto. For example, the vibration generator 2330 may include a sound generator using a coil (or a voice coil) and a magnet.

The vibration generator 2330 of each of the first and second vibration generating modules 300-1 and 300-2 according to an embodiment of the present disclosure may include a module frame 331, a bobbin 332, a magnet member 333, and a coil 334. Also, the vibration generator 2330 of each of the first and second vibration generating modules 300-1 and 300-2 may further include a center pole 335 and a damper 336.

The module frame (or a base plate) 331 may be disposed at the rear surface of the display module 100. The module frame (or a base plate) 331 may be supported at the structure 2310. For example, module frame 331 may be supported at (or coupled to) the support portion 2311 of the structure 2310. The module frame 331 according to an embodiment of the present disclosure may include a first plate 331a, a second plate 331b, and a bracket 331c.

The first plate 331a may support the magnet member 333 and may be a lower plate. The first plate 331a may be referred to as a frame body, but embodiments of the present disclosure are not limited to these terms.

The second plate 331b may have a cylindrical shape including a hollow portion and may be disposed at a periphery of a front surface the first plate 331a. The first plate 331a and the second plate 331b may be provided as one body having a U-shape. For example, the first plate 331a and the second plate 331b are not limited to these terms, and may be referred to as a yoke, etc.

The bracket (or fixing bracket) 331c may protrude from one side or a side surface of the second plate 331b. The bracket 331c may be supported or coupled to the supporting portion 2311 of the structure 2310 by a module connection member, and thus, the module frame 331 may be supported at (or coupled to) the supporting portion 2311 of the structure 2310.

The module connection member according to an embodiment of the present disclosure may be a screw or a bolt, which may pass through the bracket 331c, and may be coupled to the supporting portion 2311 of the structure 2310. For example, an elastic member such as a buffering pad may be disposed between the supporting portion 2311 of the structure 2310 and the bracket 331c. The elastic member may prevent or minimize a vibration of the display module 100 from being transferred to the module frame 331.

The module connection member according to an embodiment of the present disclosure may support or couple a bracket 331c or a module frame 331 to the supporting portion 2311 of the structure 2310. For example, the module connection member may include an adhesive member disposed between the bracket 331c and the supporting portion 2311 of the structure 2310. For example, the adhesive member may include a double-sided tape, a double-sided foam tape, a double-sided foam pad, a double-sided foam pad tape, a double-sided adhesive pad, a double-sided adhesive gap pad, or a double-sided adhesive foam pad, but embodiments of the present disclosure are not limited thereto.

The bobbin 332 may be on the module frame 331 and may vibrate the display module 100. For example, the bobbin 332 may output a sound or generate a sound pressure level at the first gap space GS1 between the rear surface of the second supporting member 150 and the structure 2310 and may vibrate the display module 100. For example, the bobbin 332 may vibrate the first portion 151 of the second supporting member 150.

The bobbin 332 according to an embodiment of the present disclosure may be disposed to be spaced apart from the rear surface of the display module 100. The bobbin 332 may be configured to include a hollow portion 332a. For example, the bobbin 332 may have a ring-shaped structure, which may be formed of a material produced by processing pulp or paper, Al or Mg or an alloy thereof, synthetic resin such as polypropylene, or a polyamide-based fiber, but embodiments of the present disclosure are not limited thereto. The bobbin 332 may vibrate based on a magnetic force, and for example, may perform a vertical (or upward and downward) reciprocating motion, thereby outputting a sound at the first gap space GS1 or vibrating the second supporting member 150.

The bobbin 332 according to an embodiment of the present disclosure may have a circular shape or an elliptical (or oval shape), but embodiments of the present disclosure are not limited thereto. The bobbin 332 having the oval shape may have an elliptical shape, a corners-rounded rectangular shape, or a non-circular curved shape having a width different from its height, but embodiments of the present disclosure are not limited thereto. For example, in the bobbin 332 having the oval shape, a ratio of a long-axis diameter and a short-axis diameter may be 1.3:1 to 2:1. The bobbin 332 having the oval shape may more improve a sound of the high-pitched sound band than the circular shape and may reduce heat caused by a vibration, and thus, the bobbin 332 having the oval shape may have a good heat dissipation characteristic.

The magnet member 333 may be provided on the module frame 331 to be accommodated into the hollow portion 332a of the bobbin 332. The magnet member 333 may be a permanent magnet accommodated into the hollow portion 332a of the bobbin 332, but embodiments of the present disclosure are not limited thereto.

The coil 334 may be wound to surround an outer circumference surface of the bobbin 332 and may be supplied with a sound signal (or a voice signal) from the outside. The coil 334 may be raised or lowered along with the bobbin 332. When a sound signal (or a current) is applied to the coil 334, a whole portion of the bobbin 332 may vibrate, for example, may perform a vertical reciprocating motion along a third direction Z, according to Fleming's left hand rule based on an application magnetic field generated around the coil 334 and an external magnetic field generated around the magnet member 333. For example, the coil 334 may be referred to as a voice coil, but embodiments of the present disclosure are not limited thereto.

The center pole 335 may be on the magnet member 333, and may guide a vibration of the bobbin 332. For example, the center pole 335 may be inserted or accommodated into the hollow portion 332a of the bobbin 332, and may be surrounded by the bobbin 332. For example, the center pole 335 may be referred to as an elevation guider or pole pieces, but embodiments of the present disclosure are not limited thereto.

The damper 336 may be disposed between the module frame 331 and the bobbin 332. For example, the damper 336 according to an embodiment of the present disclosure may be disposed between the second plate 331b of the module frame 331 and an outer circumference surface of an upper portion of the bobbin 332. The damper 336 may be provided in a creased or wrinkled structure that may be creased between one end and the other end thereof and may be contracted and relaxed based on a vibration of the bobbin 332. A vibration distance (or a vertical movement distance) of the bobbin 332 may be limited by a restoring force of the damper 336. As one example, when the bobbin 332 vibrates by a certain distance or more or vibrates by a certain distance or less, the bobbin 332 may be restored to its original position by the restoring force of the damper 336. For example, the damper 336 may be referred to as a spider, a suspension, or an edge, but embodiments of the present disclosure are not limited to these terms.

The vibration generator 2330 according to an embodiment of the present disclosure may be referred to as an internal magnetic type (or a micro type) such that the magnet member 333 may be inserted or accommodated into the hollow portion 332a of the bobbin 332.

The vibration generator 2330 according to another embodiment of the present disclosure may be referred to as an external magnetic type (or a dynamic type) such that the magnet member 333 is disposed to surround an outer portion of the bobbin 332. For example, except for that the magnet member 333 may be provided between the first plate 331a and the second plate 331b, and the center pole 335 may be provided on the first plate 331a to be inserted or accommodated into the hollow portion 332a of the bobbin 332, the external magnetic type vibration generator 2330 may be substantially similar to the internal magnetic type. Thus, detailed descriptions are omitted.

The vibration generator 2330 according to an embodiment of the present disclosure may further include a bobbin protection member 337.

The bobbin protection member 337 according to an embodiment of the present disclosure may be disposed between an upper portion of the bobbin 332 and the first portion 151 of the second supporting member 150. The bobbin protection member 337 may be disposed on the bobbin 332 to cover the hollow portion 332a of the bobbin 332, and thus, may protect the bobbin 332, thereby preventing deformation of the bobbin 332 caused by an external impact. The bobbin protection member 337 may be implemented to cover the hollow portion 332a of the bobbin 332, and thus, may increase a sound pressure level generated in the first gap space GS1 based on a vibration of the bobbin 332.

The bobbin protection member 337 according to an embodiment of the present disclosure may be provided in a molding form of an injection material or a molding product of metal. For example, the bobbin protection member 337 may include a textile reinforced material, a composite resin including a textile reinforced material, or metal, and for example, may have a heat dissipation function of dissipating heat occurring when the vibration generator 2330 are being driven. The textile reinforced material may be one or more of carbon fiber reinforced plastics (CFRP), glass fiber reinforced plastics (GFRP), and graphite fiber reinforced plastics (GFRP), or a combination thereof, but embodiments of the present disclosure are not limited thereto.

As another example, a heat dissipation member may be further provided between the display module 100 and the structure 2310. The heat dissipation member may include a metal material. For example, the heat dissipation member may include aluminum (Al), copper (Cu), silver (Ag), or an alloy thereof, but embodiments of the present disclosure are not limited thereto. The heat dissipation member may be implemented as a metal plate, a heat dissipation sheet or a heat dissipation tape. The heat dissipation member may be disposed to have a size which is greater than or equal to that of the vibration generating device 300. As another example, the heat dissipation member may be disposed to have a size which is greater than or equal to that of the second supporting member 150.

The vibration generator 2330 according to an embodiment of the present disclosure, as illustrated in FIGS. 3 and 4, may be configured in a twin type structure. The twin type structure may be referred to as a 2-array (two-array) structure. The vibration generator 2330 having the twin type structure may include two sub vibration portions 2330a and 2330b disposed on the module frame 331. The two sub vibration portions 2330a and 2330b may be referred to as two sub vibration generators. The vibration generator 2330 including the two sub vibration portions 2330a and 2330b may be referred to as a twin type vibration device, but the terms are not limited thereto.

The vibration generator 2330 according to an embodiment of the present disclosure, as illustrated in FIGS. 3 and 4, is not limited to the twin type structure and may be implemented in a single type structure or may be configured in a 2 or more-array structure. For example, the vibration generator 2330 may be configured in a 4-array structure or a 6-array structure.

The vibration generator 2330 of the first vibration generating module 300-1 may vibrate based on a sound signal to output a sound (or a sound wave) to the first rear periphery region EA1 of the display module 100, and thus, may vibrate the first rear periphery region EA1 of the display module 100 to output a sound S1 in a forward region of the display module 100. At least a portion of a sound of the high-pitched sound band among sounds output from the vibration generator 2330 of the first vibration generating module 300-1 to the first rear periphery region EA1 of the display module 100 may be reflected (or diffracted) in a lateral direction of the display module 100 by the structure 2310 of the first vibration generating module 300-1 and may be output in the lateral direction and the forward direction of the display module 100.

The vibration generator 2330 of the second vibration generating module 300-2 may vibrate based on a sound signal to output a sound (or a sound wave) to the second rear periphery region EA2 of the display module 100, and thus, may vibrate the second rear periphery region EA2 of the display module 100 to output a sound S1 in the forward region of the display module 100. At least a portion of a sound of the high-pitched sound band among sounds output from the vibration generator 2330 of the second vibration generating module 300-2 to the second rear periphery region EA2 of the display module 100 may be reflected (or diffracted) in the lateral direction of the display module 100 by the structure 2310 of the second vibration generating module 300-2 and may be output in the lateral direction and the forward direction of the display module 100.

For example, when the vibration generator 2330 of each of the first and second vibration generating modules 300-1 and 300-2 vibrates based on a sound signal, a sound (or a sound wave) generated based on a vibration of the vibration generator 2330 may be output to the first gap space GS1, a sound generated based on a vibration of the backlight part 120 based on a sound of the first gap space GS1 may be output to a sound transfer space STS, a sound S1 generated based on a vibration of the periphery regions EA1 and EA2 of the display panel 110 based on a sound of the sound transfer space STS may be output to a forward region with respect to the display panel 110, and at least a portion of a sound of the high-pitched sound band among sounds output from the vibration generator 2330 to the first gap space GS1 may be reflected (or diffracted) in the lateral direction of the display module 100 by the structure 2310 and may be output in the lateral direction and the forward direction of the display module 100.

Therefore, according to an embodiment of the present disclosure, at least a portion of a sound of the high-pitched sound band among sounds generated by the vibration generators 2330 of the first and second vibration generating modules 300-1 and 300-2 may be output in the lateral direction of the display module 100, and thus, a sound characteristic of the high-pitched sound band of a display apparatus may be enhanced. Also, according to an embodiment of the present disclosure, a reflection region (or a reflection space) of a sound generated between the display module 100 and the first and second vibration generating modules 300-1 and 300-2 by the inclined vibration generator 2330 may increase and a sound of the high-pitched sound band diffracted in the reflection region may increase, and thus, a reflection characteristic (or a diffraction characteristic) of a sound of the high-pitched sound band output in the lateral direction of the display module 100 may be enhanced. Accordingly, an output characteristic of a sound output in the lateral direction of the display module 100 may be enhanced, and thus, a sound characteristic of the high-pitched sound band of a display apparatus may be more enhanced.

Therefore, the display apparatus according to an embodiment of the present disclosure may output a sound S1 generated based on a vibration of the display module 100 by a sound output from the vibration generator 2330 of the vibration generating device 2300 disposed at the rear periphery region EA of the display module 100, and at least a portion of a sound of the high-pitched sound band among sounds output from the vibration generator 2330 of the vibration generating device 300 may be guided in the lateral direction of the display module 100 by the structure 2310 of the vibration generating device 300 and may be output in the lateral direction and the forward direction of the display module 100. Accordingly, in the display apparatus according to an embodiment of the present disclosure, a sound characteristic of the high-pitched sound band may be enhanced by a sound S2 output in the lateral direction of the display module 100.

Moreover, in the display apparatus according to an embodiment of the present disclosure, the vibration generator 2330 of the vibration generating device 300 may be disposed to be inclined or to be nonparallel to the rear surface of the display module 100, and thus, a reflection region of a sound S2 reflected (or diffracted) between the display module 100 and the vibration generating device 300 may increase and a sound of the high-pitched sound band diffracted in the reflection region may increase, thereby enhancing a reflection characteristic (or a diffraction characteristic) of a sound of the high-pitched sound band output in the lateral direction of the display module 100. Accordingly, an output characteristic of a sound output in the lateral direction of the display module 100 may be enhanced, and thus, a sound characteristic of the high-pitched sound band of a display apparatus may be more enhanced.

Figure 6:
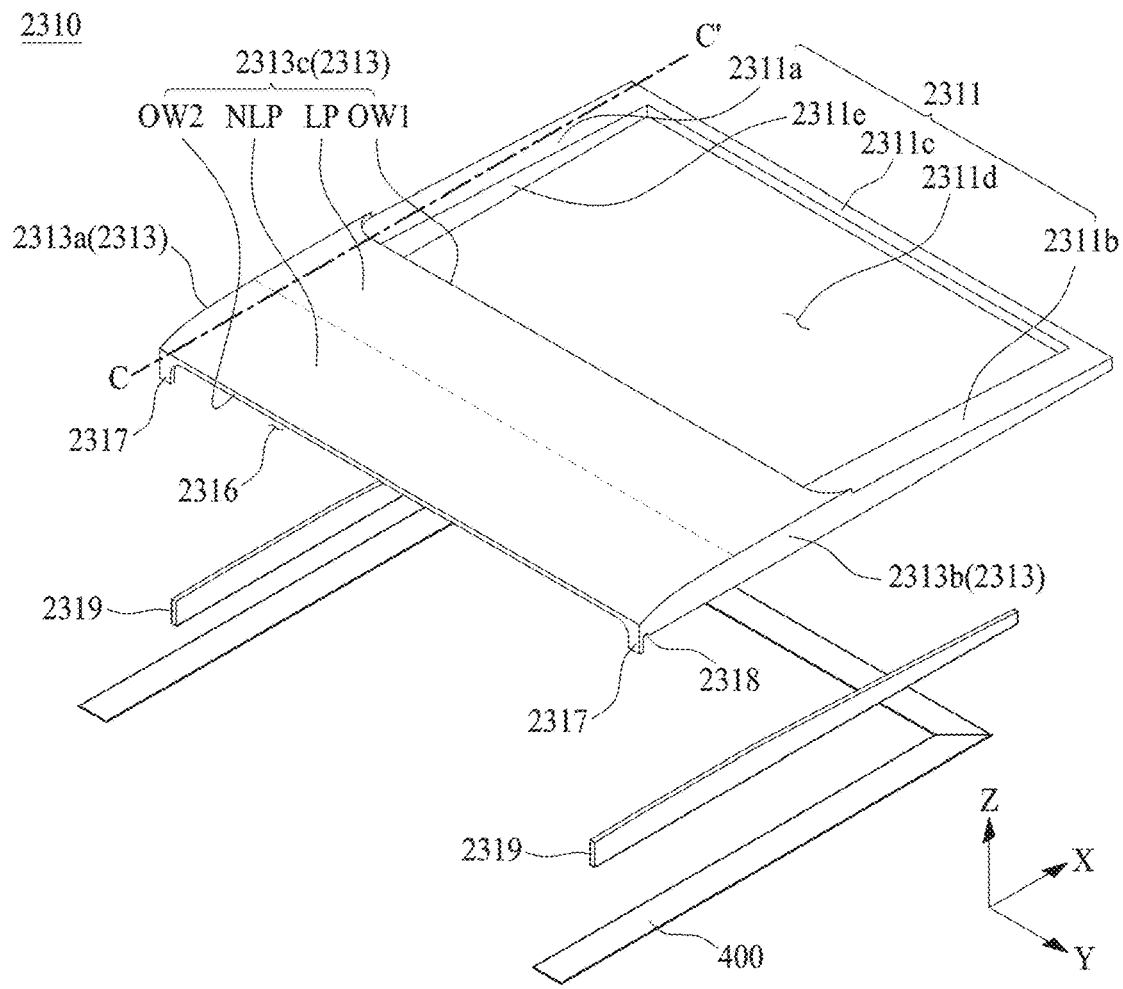
FIG. 6 illustrates a structure of a vibration generating module according to an embodiment of the present disclosure.
Figure 7:
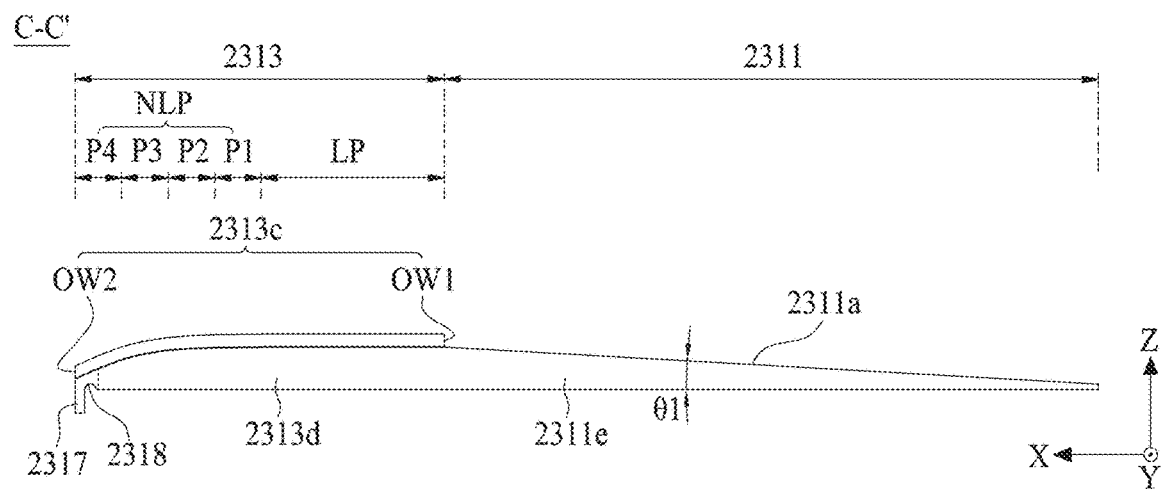
FIG. 7 is a cross-sectional view taken along line C-C' illustrated in FIG. 6.

FIG. 6 illustrates a structure of a vibration generating module according to an embodiment of the present disclosure, and FIG. 7 is a cross-sectional view taken along line C-C' illustrated in FIG. 6.

With reference to FIGS. 4 to 7, a structure 2310 of a plurality of vibration generating modules 300-1 and 300-2 according to an embodiment of the present disclosure may include a supporting portion 2311, a sound guide portion 2313, and a sound emission port 2316.

The supporting portion 2311 may be disposed at a rear region of the second supporting member 150. The supporting portion 2311 may be supported at (or connected to) the rear region of the second supporting member 150 by the second connection member 400.

The supporting portion 2311 according to an embodiment of the present disclosure may include first to third supporting portions 2311a to 2311c and an opening portion 2311d.

The first supporting portion 2311a may be disposed along a first direction X and may be configured to support a first side (or one portion) of the vibration generator 2330. The second supporting portion 2311b may be configured to be parallel to the first supporting portion 2311a and to support a second side (or other portion) of the vibration generator 2330.

Each of the first and second supporting portions 2311a and 2311b according to an embodiment of the present disclosure may have a first length parallel to the first direction X, a second length parallel to a second direction Y, and a thickness parallel to a third direction Z. A thickness of each of the first and second supporting portions 2311a and 2311b may be thickened and increase progressively toward one side or a side surface of the display module 100 along the first direction X.

Each of the first and second supporting portions 2311a and 2311b according to an embodiment of the present disclosure may include a first surface and a second surface. The first surface may be adjacent to the rear region of the display module 100. The second surface may support the vibration generator 2330 and may be nonparallel to the rear region of the display module 100. The second surface may support the vibration generator 2330.

The first surface of each of the first and second supporting portions 2311a and 2311b may be parallel to the rear surface of the display module 100.

The second surface of each of the first and second supporting portions 2311a and 2311b may be opposite to the first surface and may be inclined or sloped from the rear region of the display module 100. The second surface of each of the first and second supporting portions 2311a and 2311b may be a top surface, an upper surface, a supporting surface, or an inclined surface, but embodiments of the present disclosure are not limited thereto.

The second surface of each of the first and second supporting portions 2311a and 2311b may be inclined or sloped at an angle θ1 of 5 degrees or less with respect to the rear surface of the display module 100. Therefore, the second surface of each of the first and second supporting portions 2311a and 2311b may be disposed so that the vibration generator 2330 is nonparallel to the rear surface of the display module 100 or the rear surface of the second supporting member 150. For example, in each of the first and second supporting portions 2311a and 2311b, an angle θ1 between the first surface and the second surface may be about 1 degree to about 5 degrees, but embodiments of the present disclosure are not limited thereto.

In each of the first and second supporting portions 2311a and 2311b, a thickness between the first surface and the second surface may be thickened or increase progressively toward the one side or the side surface of the display module 100 along the first direction X. For example, in each of the first and second supporting portions 2311a and 2311b, a distance between the first surface and the second surface may increase progressively from the third supporting portion 2311c to the sound guide portion 2313 along the first direction X.

The third supporting portion 2311c may be disposed along the second direction Y and may be disposed between one side of the first supporting portion 2311a and one side of the second supporting portion 2311b. The third supporting portion 2311c may be configured to support a third side of the vibration generator 2330.

The third supporting portion 2311c according to an embodiment of the present disclosure may have a first length parallel to the first direction X, a second length parallel to the second direction Y, and a thickness parallel to the third direction Z. A thickness of the third supporting portion 2311c may be thickened and increase progressively toward one side or a side surface of the display module 100 along the first direction X.

The third supporting portion 2311c may include a first surface adjacent to the rear region of the display module 100 and a second surface nonparallel to the rear region of the display module 100. The second surface may support a third side of the vibration generator 2330. For example, in the third supporting portion 2311c, a distance between the first surface and the second surface may increase progressively from the third supporting portion 2311c to the sound guide portion 2313 along the first direction X.

The first surface of each of the first to third supporting portions 2311a to 2311c may be disposed at the rear surface of the display module 100 or the rear surface of the second supporting member 150. The first surface of each of the first to third supporting portions 2311a to 2311c may be supported at (or connected to) the rear surface of the display module 100 or the rear surface of the second supporting member 150 by the second connection member 400. The second surface of each of the first to third supporting portions 2311a to 2311c may be disposed at a rear periphery portion of each of first to third sides of the vibration generator 2330. The second surface of each of the first to third supporting portions 2311a to 2311c may support a rear periphery portion of each of the first to third sides of the vibration generator 2330. Accordingly, the vibration generator 2330 may be nonparallel to the rear surface of the display module 100 or the rear surface of the second supporting member 150.

The opening portion 2311d may be surrounded by the first to third supporting portions 2311a to 2311c. The opening portion 2311d may overlap the vibration generator 2330. The opening portion 2311d may overlap a portion, other than a periphery portion, of the first to third sides of the vibration generator 2330. For example, the opening portion 2311d may provide the first gap space GS1 between the inclined vibration generator 2330 and the rear surface of the display module 100 (or the rear surface of the second supporting member 150).

The vibration generator 2330 disposed at the supporting portion 2311 may be inclined from the rear surface (or the rear surface of the second supporting member 150) of the display module 100, and thus, a distance (or a shortest distance) between the vibration generator 2330 and the rear surface of the display module 100 may increase progressively toward the one side or the side surface of the display module 100 along the first direction X, or may increase progressively from the third supporting portion 2311c to the sound guide portion 2313 along the first direction X.

The sound guide portion 2313 may extend from the supporting portion 2311 along the first direction X and may be configured to be disposed at a rear peripheral region of the second supporting member 150.

The sound guide portion 2313 may have a first length parallel to the first direction X, a second length parallel to the second direction Y, and a thickness parallel to the third direction Z.

According to an embodiment of the present disclosure, a first length of the sound guide portion 2313 may have a length which is 3 mm or more and a total length or less of the vibration generator 2330 to increase a reflection region (or reflection space) of a sound traveling in the lateral direction of the display module 100. For example, when the first length of the sound guide portion 2313 is less than 3 mm, a length of the reflection region (or the reflection space) of the sound traveling in the lateral direction of the display module 100 may decrease, and thus, there may be a problem where a reflection characteristic of a sound of a high-pitched sound band is not obtained. For example, the first length of the sound guide portion 2313 may be longer than half of a length of the vibration generator 2330 and shorter than a total length of the vibration generator 2330.

The sound guide portion 2313 according to an embodiment of the present disclosure may include a first extension portion 2313a, a second extension portion 2313b, and a cover portion 2313c.

The first extension portion 2313a may extend from a first supporting portion 2311a of the supporting portion 2311 along the first direction X. The second extension portion 2313b may extend from a second supporting portion 2311b of the supporting portion 2311 in parallel with the first extension portion 2313a. For example, each of the first extension portion 2313a and the second extension portion 2313b may extend from one side (for example, an end) of the supporting portion 2311 to have a length which is 3 mm or more and less than or equal to a total length of the vibration generator 2330 along the first direction X.

Each of the first and second extension portions 2313a and 2313b may include a first surface and a second surface. The first surface may be adjacent to the rear region of the display module 100. The second surface may support the cover portion 2313c and may be nonparallel to the rear region of the display module 100.

The first surface of each of the first and second extension portions 2313a and 2313b may be parallel to the rear surface of the display module 100. The second surface of each of the first and second extension portions 2313a and 2313b may be opposite to the first surface and may be nonparallel to the rear surface of the display module 100.

The second surface of each of the first and second extension portions 2313a and 2313b according to an embodiment of the present disclosure may include a 2-$1^{st}$ surface, extending from a second surface of the supporting portion 2311 along the first direction X, and a 2-$2^{nd}$ surface which extends in a curved shape (or a curved surface shape or a curved line shape or a bent surface) from an end of the 2-$1^{st}$ surface along the first direction X. For example, in each of the first and second extension portions 2313a and 2313b, a distance (or a thickness) between the first surface and the 2-$1^{st}$ surface may be the same. In each of the first and second extension portions 2313a and 2313b, a distance (or a thickness) between the first surface and the 2-$2^{nd}$ surface may decrease progressively toward the one side or the side surface of the display module 100 along the first direction X.

The cover portion 2313c may be configured to cover the rear periphery region EA of the display module 100 disposed between the one side or the side surface of the display module 100 and the vibration generator 2330. The cover portion 2313c may be disposed on the first extension portion 2313a and the second extension portion 2313b and may cover a space between the first extension portion 2313a and the second extension portion 2313b. A space, which is covered by the cover portion 2313c and is provided between the first extension portion 2313a and the second extension portion 2313b on the rear surface of the display module 100 (or the rear surface of the second supporting member 150), may be a second gap space GS2 connected to (or communicated with) the first gap space GS1 between the rear surface of the display module 100 and the vibration generator 2330. A sound output from the vibration generator 2330 to the first gap space GS1 may be reflected (or diffracted) in each of the first gap space GS1 and the second gap space GS2 at least once and may travel (or propagate) toward the sound emission port 2316.

The cover portion 2313c according to an embodiment of the present disclosure may have a first length parallel to the first direction X, a second length parallel to the second direction Y, and a thickness parallel to a third direction Z.

The first length of the cover portion 2313c extend from the one side (for example, the end) of the supporting portion 2311 to have a length which is 3 mm or more and less than or equal to the total length of the vibration generator 2330. For example, the first length of the cover portion 2313c may be longer than half of a length of the vibration generator 2330 and shorter than the total length of the vibration generator 2330.

A distance between the rear surface of the display module 100 (or the rear surface of the second supporting member 150) and the cover portion 2313c may be implemented to decrease progressively toward the one side or the side surface of the display module 100 along the first direction X, and thus, a thickness of a periphery portion of the first supporting member 500 covering a periphery portion EA of the display module 100 may decrease. Therefore, a thickness of a periphery portion of the display apparatus overlapping the periphery portion EA of the display module 100 may decrease. For example, a rear periphery portion of the first supporting member 500 overlapping the cover portion 2313c may be configured to include a third portion 550 inclined between a first portion 510 thereof and a second portion 530 thereof, thereby reducing a thickness of a periphery portion of the display apparatus.

The cover portion 2313c according to an embodiment of the present disclosure may include a linear portion LP and a nonlinear portion NLP. For example, the cover portion 2313c may be a plate structure, a plate structure material, or a plate having a three-dimensional (3D) structure, which includes the linear portion LP and the nonlinear portion NLP.

The linear portion LP may be disposed to be adjacent to the supporting portion 2311. For example, the linear portion LP may be disposed on the first and second extension portions 2313a and 2313b. The linear portion LP may cover a space between the first and second extension portions 2313a and 2313b. The linear portion LP may be configured to be disposed on the 2-$1^{st}$ surface of each of the first and second extension portions 2313a and 2313b. According to an embodiment of the present disclosure, a distance (or a thickness) between the rear surface of the display module 100 (or the rear surface of the second supporting member 150) and the linear portion LP may be the same along the first direction X. For example, the linear portion LP may have a plate structure having a tetragonal shape. For example, the linear portion LP may be a planar portion, a flat portion, a planar structure, or a flat cover.

The nonlinear portion NLP may extend to the one side of the display module 100. For example, the nonlinear portion NLP may extend toward the side surface of the display module 100. The nonlinear portion NLP may extend from one side (for example, an end) of the linear portion LP to the one side (for example, the side surface) of the display module 100 to have a cross-sectional structure having a curved shape (or a curved surface shape or a curved line shape or a bent shape) along the first direction X. The nonlinear portion NLP according to an embodiment of the present disclosure may be disposed on the 2-$2^{nd}$ surface of each of the first and second extension portions 2313a and 2313b to have a cross-sectional structure having a curved shape (or a curved surface shape or a curved line shape or a bent shape). For example, the nonlinear portion NLP may include a cross-sectional structure which is bent in a curved shape (or a curved surface shape or a curved line shape or a bent shape) between one side thereof adjacent to the linear portion LP and the other side thereof adjacent to one side or the side surface of the display module 100. For example, the nonlinear portion NLP may be a curved portion, a bent portion, a curved structure, or a curved cover. For example, the nonlinear portion NLP may be a sound guide having a round shape, but the terms are not limited thereto. For example, the sound guide portion 2313 may be a sound guide having a round shape, but the terms are not limited thereto.

According to an embodiment of the present disclosure, a distance (or a thickness) between the rear surface of the display module 100 (or the rear surface of the second supporting member 150) and the nonlinear portion NLP may decrease progressively toward the one side or the side surface of the display module 100 along the first direction X.

The nonlinear portion NLP according to an embodiment of the present disclosure may include a plurality of curved portions P1 to P4. According to an embodiment of the present disclosure, one or more of the plurality of curved portions P1 to P4 may have different curvature radiuses. According to another embodiment of the present disclosure, the plurality of curved portions P1 to P4 may have different curvature radiuses. For example, a curvature radius of the curved portion P1 adjacent to the vibration generator 2330 among the plurality of curved portions P1 to P4 may be largest, and a curvature radius of the curved portion P4 adjacent to the one side or the side surface of the display module 100 among the plurality of curved portions P1 to P4 may be smallest. For example, a curvature radius of each of the plurality of curved portions P1 to P4 may decrease progressively in a direction from the vibration generator 2330 to the one side or the side surface of the display module 100 along the first direction X. Therefore, a distance (or a thickness) between the rear surface of the display module 100 (or the rear surface of the second supporting member 150) and the nonlinear portion NLP may decrease progressively toward the one side or the side surface of the display module 100 along the first direction X.

According to an embodiment of the present disclosure, the plurality of curved portions P1 to P4 may have the same length or different lengths with respect to the first direction X. For example, with respect to the first direction X, lengths of the plurality of curved portions P1 to P4 may be the same, or may increase or decrease progressively toward the one side or the side surface of the display module 100.

According to an embodiment of the present disclosure, the linear portion LP and the nonlinear portion NLP may have the same length or different lengths with respect to the first direction X. For example, with respect to the first direction X, the nonlinear portion NLP may have a length which is longer than that of the linear portion LP, but embodiments of the present disclosure are not limited thereto.

The cover portion 2313c according to an embodiment of the present disclosure may further include a first surface OW1 and a second surface OW2. The first surface OW1 may be a first sidewall. The second surface OW2 may be a second sidewall.

The first surface OW1 may be an outer surface (or an outer sidewall) of the linear portion LP parallel to the second direction Y. The first surface OW1 may surround a side surface of a fourth side of the vibration generator 2330 which is inclined at the supporting portion 2311, thereby preventing the movement of the vibration generator 2330. For example, both periphery portions of the first surface OW1 may include a curved portion corresponding to a curved corner portion of the vibration generator 2330. For example, the first surface OW1 may be disposed to be adjacent to the supporting portion 2311 in parallel with the second direction Y and may contact one side or a side surface of the fourth side of the vibration generator 2330. For example, the first surface OW1 may directly contact one side or a side surface of the fourth side of the vibration generator 2330.

The second surface OW2 may be an outer surface (or an outer sidewall) of the nonlinear portion NLP parallel to the second direction Y. The second surface OW2 may be configured to be parallel to the third direction Z. For example, the second surface OW2 may be a cut surface of the nonlinear portion NLP which is cut along the third direction Z.

The second surface OW2, as illustrated in FIG. 5, may contact the second portion 530 of the first supporting member 500. For example, the second surface OW2, as illustrated in FIG. 5, may directly contact the second portion 530 of the first supporting member 500. For example, the second surface OW2 may directly contact a first surface or an inner surface of the second portion 530, and thus, a sound output to the edge gap EG through the sound emission port 2316 may be prevented from being leaked between the display module 100 and the first portion 510 of the first supporting member 500 through a space between the second sidewall OW2 and the second portion 530.

The sound emission port 2316 may be parallel to the second direction Y and may be disposed between the second surface OW2 of the sound guide portion 2313 and the rear surface of the display module 100 along the third direction Z. For example, the sound emission port 2316 may be a separation space between the second surface OW2 of the sound guide portion 2313 and the display module 100. According to an embodiment of the present disclosure, the sound emission port 2316 may include a slit or a slot shape which extends along the second direction Y between the second surface OW2 of the sound guide portion 2313 and the display module 100.

According to an embodiment of the present disclosure, with respect to the first direction X, a distance D1 between the second surface OW2 of an end (or the nonlinear portion NLP) of the sound guide portion 2313 and the one side or the side surface of the display module 100 may be 1±0.5 mm so that the sound S2 traveling via the sound guide portion 2313 is smoothly output in the forward direction of the display module 100 through the sound emission port 2316. For example, with respect to the first direction X, a distance D1 between the second surface OW2 of the sound guide portion 2313 and the one side or the side surface of the panel guide 130 may be 1±0.5 mm.

According to an embodiment of the present disclosure, with respect to the third direction Z, a shortest distance between the second surface OW2 of the sound guide portion 2313 and the display module 100 may be ±0.5 mm so that the sound S2 traveling via the sound guide portion 2313 is smoothly output in the forward direction of the display module 100 through the sound emission port 2316. For example, with respect to the third direction Z, a shortest distance between the second surface OW2 of the sound guide portion 2313 and the one side or the side surface of the panel guide 130 may be ±0.5 mm.

According to an embodiment of the present disclosure, with respect to the first direction X, a shortest distance D2 between the one side or the side surface of the display module 100 (or the one side or the side surface of the panel guide 130) and the vibration generator 2330 may be adjusted to about 30 mm to about 60 mm, but embodiments of the present disclosure are not limited thereto. When the shortest distance D2 between the one side or the side surface of the display module 100 (or the one side or the side surface of the panel guide 130) and the vibration generator 2330 is 60 mm or more with respect to the first direction X, a reflection characteristic of a sound of the high-pitched sound band generated between the display module 100 and the vibration generating device 300 may be reduced. For example, considering a reflection characteristic of a sound of the high-pitched sound band and a thickness of periphery of the display apparatus, a shortest distance D2 between a side surface of the panel guide 130 and the vibration generator 2330 may be adjusted to about 30 mm to about 35 mm, but embodiments of the present disclosure are not limited thereto.

The structure 2310 of each of the vibration generating modules 300-1 and 300-2 according to an embodiment of the present disclosure may further include a protrusion portion 2317 and a concave portion 2318.

The protrusion portion 2317 may include a pair of protrusion portions. The protrusion portion 2317 may be a corner projection or corner bump. The pair of protrusion portions 2317 may protrude from both corner portions of the sound guide portion 2313 along the third direction Z. For example, the protrusion portion 2317 may protrude from a corner portion of both ends of the sound guide portion 2313 along the third direction Z. The pair of protrusion portions 2317 may surround a portion of the side surface of the display module 100. For example, an inner surface of each of the pair of protrusion portions 2317 may contact or be spaced apart from the side surface of the display module 100. For example, the inner surface of each of the pair of protrusion portions 2317 may contact or be spaced apart from one side or a side surface of the panel guide 130. The pair of protrusion portions 2317 may prevent a sound S2, output through the sound emission port 2316, from being output along the second direction Y. The pair of protrusion portions 2317 may define a length of the sound emission port 2316 with respect to the second direction Y.

The concave portion 2318 may be configured to be concave between each of the pair of protrusion portions 2317 and each of the first and second extension portions 2313a and 2313b of the sound guide portion 2313. The concave portion 2318 may accommodate the guide side portion 133 of the panel guide 130, and thus, may prevent a physical contact between the structure 2310 and the panel guide 130 moving along the third direction Z. Accordingly, the structure 2310 may be prevented from being lifted by the movement of the panel guide 130.

The structure 2310 of the vibration generating modules 300-1 and 300-2 according to an embodiment of the present disclosure may further include a sound reflection prevention member 2319.

The sound reflection prevention member 2319 may be disposed at a third surface 2311e and 2313d of each of the sound guide portion 2313 and the supporting portion 2311 parallel to the first direction X. Each of the third surfaces 2311e and 2313d may be an inner surface. For example, the sound reflection prevention member 2319 may be disposed at the third surface 2311e of the supporting portion 2311 and the third surface 2313d of the sound guide portion 2313. The sound reflection prevention member 2319 may prevent sounds, generated in the first and second gap spaces GS1 and GS2, from being reflected by the third surface 2311e of the supporting portion 2311 and the third surface 2313d of the sound guide portion 2313, thereby improving a deep phenomenon of a sound. For example, the sound reflection prevention member 2319 may be a sound absorption member. For example, the sound reflection prevention member 2319 may be a pad, a tape, a foam tape, a foam pad, or a sponge, but embodiments of the present disclosure are not limited thereto.

According to an embodiment of the present disclosure, the sound reflection prevention member 2319 may be configured to cover one or more or all of the third surface 2311e of each of the first and second supporting portions 2311a and 2311b of the supporting portion 2311 and the third surface 2313d of each of the first and second extension portions 2313a and 2313b of the sound guide portion 2313. For example, the sound reflection prevention member 2319 may be configured in a shape corresponding to the third surface 2311e of the first supporting portion 2311a and the third surface 2313d of the first extension portion 2313a. The sound reflection prevention member 2319 may be attached on one or more or entire of the third surface 2311e of the first supporting portion 2311a and the third surface 2313d of the first extension portion 2313a. Also, the sound reflection prevention member 2319 may be configured in a shape corresponding to the third surface 2311e of the second supporting portion 2311b and the third surface 2313d of the second extension portion 2313b. The sound reflection prevention member 2319 may be attached on one or more or entire of the third surface 2311e of the second supporting portion 2311b and the third surface 2313d of the second extension portion 2313b.

Figure 8:
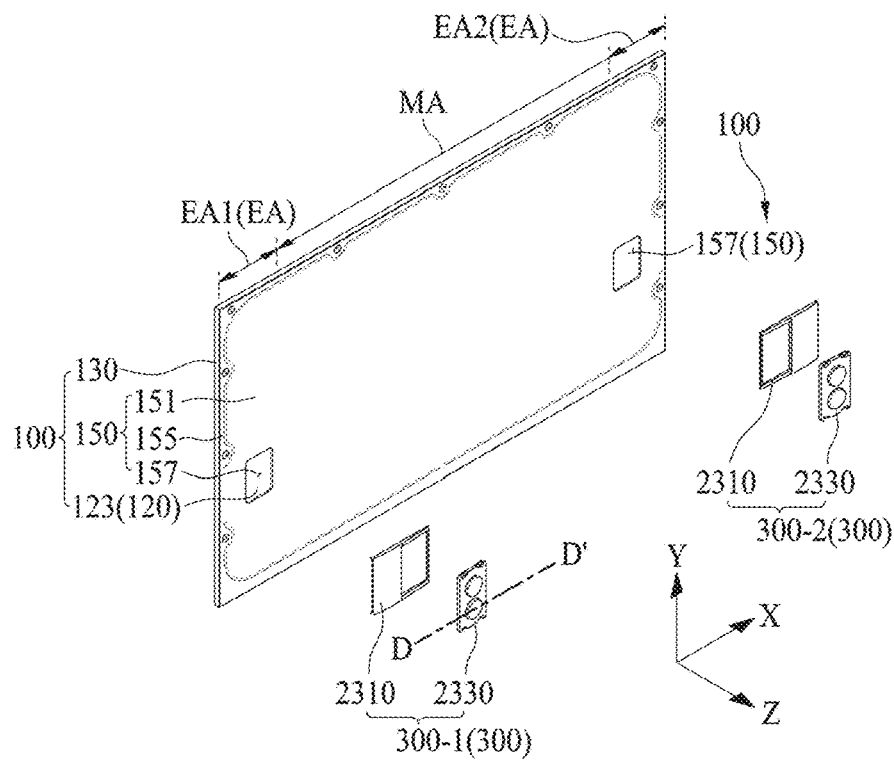
FIG. 8 illustrates a display apparatus according to another embodiment of the present disclosure.
Figure 9:
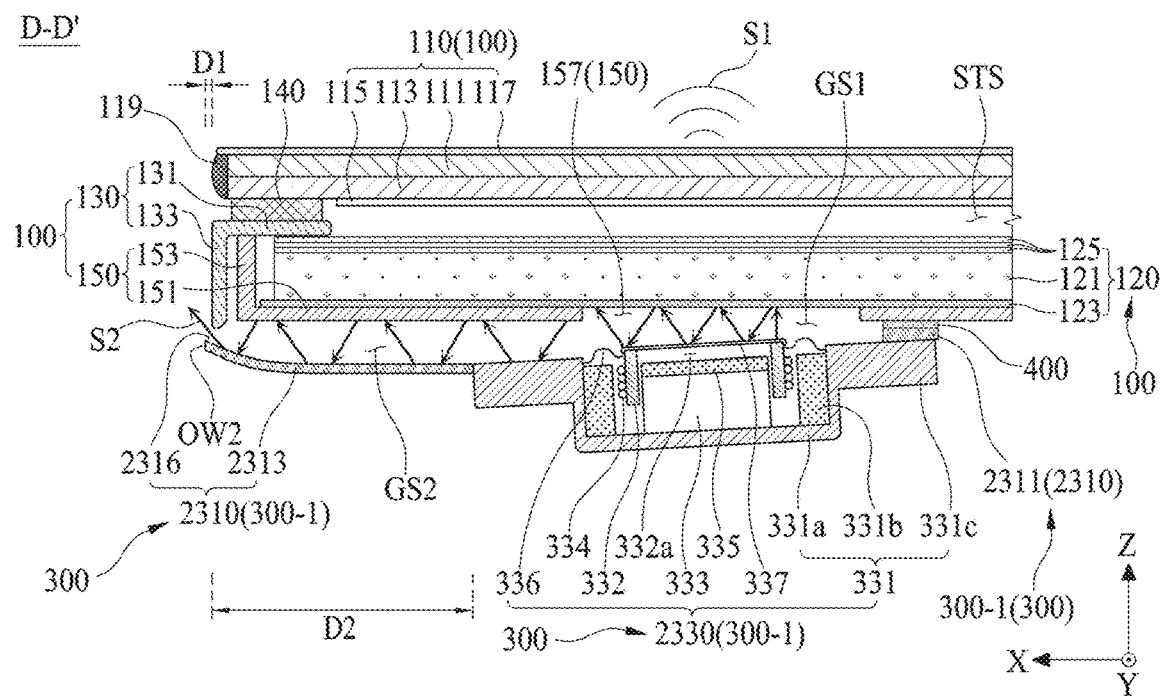
FIG. 9 is a cross-sectional view taken along line D-D' illustrated in FIG. 8.

FIG. 8 illustrates a display apparatus according to another embodiment of the present disclosure, and FIG. 9 is a cross-sectional view taken along line D-D' illustrated in FIG. 8. The drawings illustrate an embodiment where a structure of a second supporting member in the display apparatus illustrated in FIGS. 1 to 7 is modified. In the following description, therefore, a second supporting member will be described in detail, the other elements are referred to by the same reference numerals as FIGS. 3 to 7, and their repetitive descriptions are omitted or will be briefly given.

With reference to FIGS. 8 and 9, in the display apparatus according to another embodiment of the present disclosure, a second supporting member 150 may further include at least one hole 157 which overlaps a vibration generating device 300. For example, the second supporting member 150 may include a material including ferrous metal described above.

The hole 157 may be configured at a first portion 151. For example, the hole 157 may be configured at a first portion 151 to overlap the vibration generating device 300.

The hole 157 according to an embodiment of the present disclosure may be provided at the first portion 151 to overlap a magnetic field region of the vibration generating device 300. The second supporting member 150 may support a portion, other than the magnetic field region, of the vibration generating device 300. The hole 157 may overlap a magnetic field region of each of first and second vibration generating modules 300-1 and 300-2 of the vibration generating device 300. For example, the hole 157 may be implemented to have a size which is greater than that of the magnetic field region of each of the first and second vibration generating modules 300-1 and 300-2. Accordingly, a phenomenon where a magnetic field generated in the vibration generating device 300 is distorted by the first portion 151 of the second supporting member 150 may be prevented or minimized, thereby enhancing a sound output characteristic of the vibration generating device 300, for example, a sound output characteristic of each of the first and second vibration generating modules 300-1 and 300-2.

The hole 157 according to an embodiment of the present disclosure may be provided at the first portion 151 to overlap each of the first and second vibration generating modules 300-1 and 300-2 of the vibration generating device 300. For example, the hole 157 may overlap a vibration generator 2330 which is provided at each of the first and second vibration generating modules 300-1 and 300-2. For example, the hole 157 may overlap a bobbin 332 or a magnet member 333 of the vibration generator 2330.

The hole 157 according to an embodiment of the present disclosure may have a size which is greater than that of the bobbin 332 or the magnet member 333 of the vibration generator 2330. For example, the hole 157 may have a polygonal shape, a circular shape, or an oval shape, which has a greater size than that of the bobbin 332 or the magnet member 333 of the vibration generator 2330, but embodiments of the present disclosure are not limited thereto. For example, the hole 157 may be formed by a patterning process or a punching process performed of the second supporting member 150, but embodiments of the present disclosure are not limited thereto. For example, the hole 157 may be referred to as a first hole, a cover hole, a pattern hole, a hole pattern, a through hole, or a perforation hole, but embodiments of the present disclosure are not limited thereto.

A sound output from each of the first and second vibration generating modules 300-1 and 300-2 of the vibration generating device 300 may be output in a forward direction of the display module 100 through the hole 157. At least a portion S2 of a sound of the high-pitched sound band among sounds output from each of the first and second vibration generating modules 300-1 and 300-2 may be output in a lateral direction of the display module 100.

Therefore, in the display apparatus according to another embodiment of the present disclosure, at least a portion of a sound of the high-pitched sound band among sounds generated based on a vibration of the vibration generating device 300 may be guided in the lateral direction of the display module 100 by a structure 2310 of the vibration generating device 300 and may be output in the lateral direction and the forward direction of the display module 100, and thus, a sound characteristic of the high-pitched sound band may be enhanced by a sound S2 output in the lateral direction of the display module 100. Also, because the display apparatus according to another embodiment of the present disclosure includes the second supporting member 150 including the hole 157 overlapping the magnetic field region of the vibration generating device 300, the distortion of a magnetic field of the vibration generating device 300 caused by the second supporting member 150 may be prevented or minimized, and thus, a sound output characteristic of the vibration generating device 300 may be enhanced. Accordingly, a sound output characteristic based on a vibration of the vibration generating device 300 may be enhanced.

Figure 10:
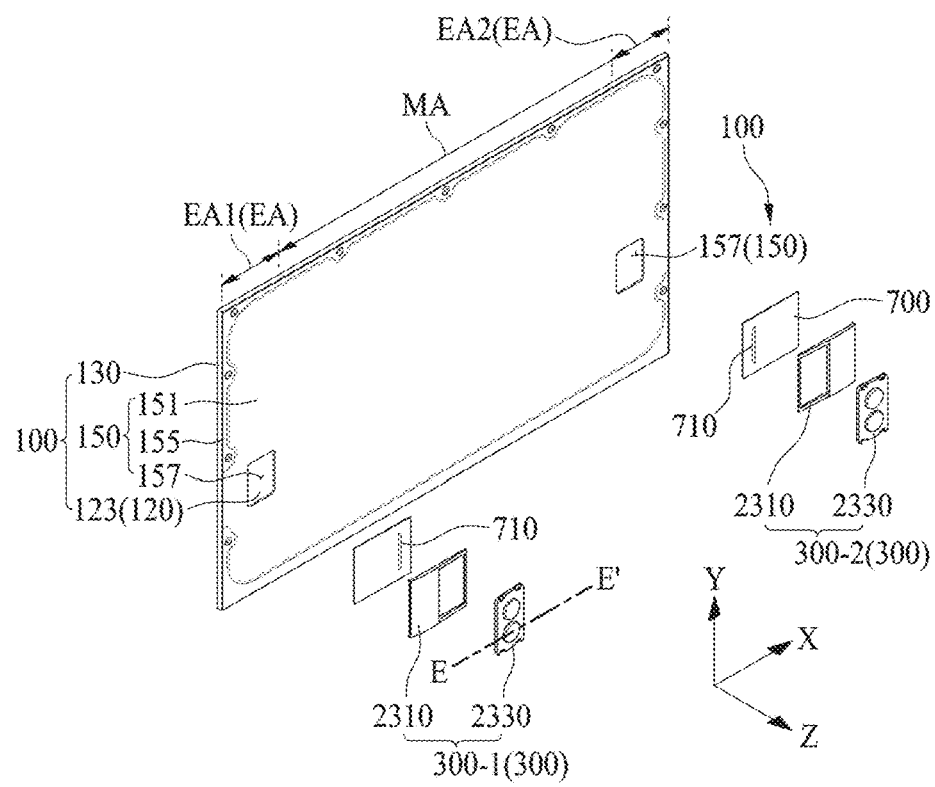
FIG. 10 illustrates a display apparatus according to another embodiment of the present disclosure.
Figure 11:
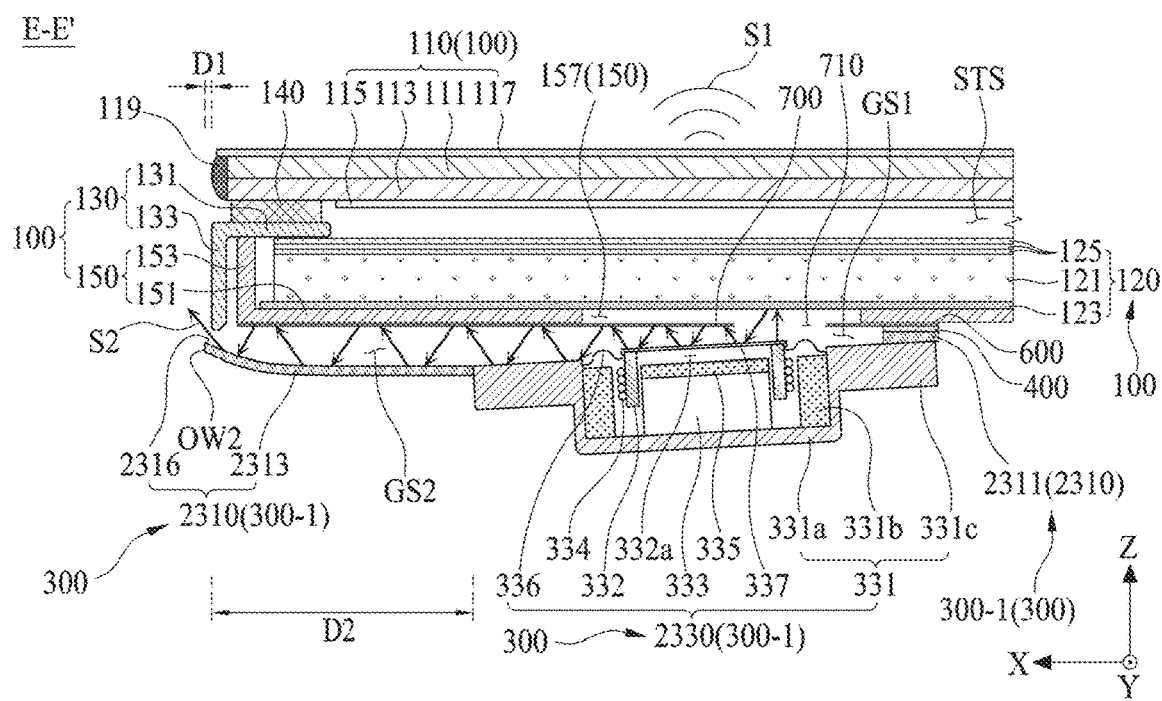
FIG. 11 is a cross-sectional view taken along line E-E' illustrated in FIG. 10.

FIG. 10 illustrates a display apparatus according to another embodiment of the present disclosure, and FIG. 11 is a cross-sectional view taken along line E-E' illustrated in FIG. 10. The drawings illustrate an embodiment where a plate is additionally provided in the display apparatus illustrated in FIGS. 8 and 9. In the following description, therefore, a plate will be described in detail, the other elements are referred to by the same reference numerals as FIGS. 3 to 9, and their repetitive descriptions are omitted or will be briefly given.

With reference to FIGS. 10 and 11, the display apparatus according to another embodiment of the present disclosure may further include a plate 700 disposed between a display module 100 and a vibration generating device 300.

The plate 700 may be disposed between each of first and second vibration generating modules 300-1 and 300-2 of the vibration generating device 300 and a rear surface of the display module 100. For example, the plate 700 may be disposed between a structure 2310 of each of first and second vibration generating modules 300-1 and 300-2 and the rear surface of the display module 100. For example, the plate 700 may be disposed between a second supporting member 150 and the vibration generating device 300. For example, the plate 700 may be disposed between the structure 2310 of each of first and second vibration generating modules 300-1 and 300-2 and a first portion 151 of the second supporting member 150. The plate 700 may support the structure 2310 of each of first and second vibration generating modules 300-1 and 300-2.

The plate 700 according to an embodiment of the present disclosure may be connected or coupled to the first portion 151 of the second supporting member 150 overlapping the vibration generating device 300 and may support the vibration generating device 300. For example, the plate 700 may be connected or disposed to the first portion 151 of the second supporting member 150 to cover a hole 157 of the second supporting member 150.

The plate 700 according to an embodiment of the present disclosure may be configured to have a size which is greater than that of the hole 157 of the second supporting member 150. For example, the plate 700 may be configured to have a size which is greater than or equal to that of each of the first and second vibration generating modules 300-1 and 300-2 of the vibration generating device 300.

The plate 700 may include a material which differs from that of the second supporting member 150. The plate 700 according to an embodiment of the present disclosure may include nonferrous metal. For example, when the plate 700 includes a ferrous material, distortion of a magnetic field generated in the vibration generating device 300 may occur. To prevent or decrease the magnetic field distortion of the vibration generating device 300 caused by the plate 700, the plate 700 may include a nonferrous material. For example, the plate 700 may include a material other than a nonferrous material included in the magnet member 333 of the vibration generator 2330. For example, the plate 700 may include one or more of Al, a Mg, a Mg alloy, magnesium (Mg) and lithium (Li) alloy, and an Al alloy, but embodiments of the present disclosure are not limited thereto. For example, the plate 700 may include a material which does not include Fe. Accordingly, a phenomenon where a magnetic field generated in the vibration generating device 300 is distorted by the second supporting member 150 or the plate 700 may be prevented or minimized, thereby enhancing a sound output characteristic of the vibration generating device 300, for example, a sound output characteristic of each of the first and second vibration generating modules 300-1 and 300-2.

The plate 700 according to an embodiment of the present disclosure may further include a communication hole 710.

The communication hole 710 may overlap the hole 157 disposed at the second supporting member 150. The communication hole 710 may communicate the hole 157 disposed at the second supporting member 150 and the first gap space GS1. The communication hole 710 may be a sound transmission region where a sound (or a sound wave) output from the vibration generating device 300 is transferred (or propagated) to a rear surface of the display module 100.

The communication hole 710 according to an embodiment of the present disclosure may have a size which is relatively less than that of the hole 157 disposed at the second supporting member 150. The communication hole 710 according to an embodiment of the present disclosure may include a first length parallel to a first direction X and a second length which is parallel to a second direction Y and is longer than the first length. The communication hole 710 may be configured to extend along the second direction Y.

The communication hole 710 according to an embodiment of the present disclosure may have a shape which differs from that of the hole 157 disposed at the second supporting member 150. The communication hole 710 may have a polygonal shape, a circular shape, or an oval shape, but embodiments of the present disclosure are not limited thereto. For example, the communication hole 710 may have a slit shape (or a slot shape) which overlaps the hole 157 disposed at the second supporting member 150, and both periphery portions of the communication hole 710 may include a round portion having a curved shape. According to an embodiment of the present disclosure, the communication hole 710 may be formed by a patterning process or a punching process performed of the plate 700, but embodiments of the present disclosure are not limited thereto. For example, the communication hole 710 may be referred to as a second hole, a connection hole, an air hole, a pattern hole, a hole pattern, a through hole, or a perforation hole, but embodiments of the present disclosure are not limited thereto.

The plate 700 including the communication hole 710 according to an embodiment of the present disclosure may be a sound balance member. The plate 700 may be configured to maintain a balance between a forward sound (or a transmissive sound), traveling in the forward direction of the display module 100, and a lateral sound (or a reflection sound), traveling in the lateral direction of the display module 100, among sounds generated in the vibration generating device 300. For example, the plate 700 may be configured to maintain a balance between a sound transferred (or propagated) to the display module 100 and a sound reflected in the first gap space GS1 while maintaining an output (or radiation) characteristic of the high-pitched sound band output in the lateral direction of the display module 100, based on a sound generated in the vibration generating device 300.

According to an embodiment of the present disclosure, to maintain a balance of the sound generated in the vibration generating device 300, the communication hole 710 may overlap only a portion of a magnetic field region formed in the vibration generating device 300. The communication hole 710 may overlap half or less of the magnetic field region formed in the vibration generating device 300. The communication hole 710 may overlap a portion of a bobbin 332 or a magnet member 333 of a vibration generator 2330 provided at each of the first and second vibration generating modules 300-1 and 300-2 of the vibration generating device 300. The communication hole 710 may be implemented to have a size which is less than that of the bobbin 332 or the magnet member 333 of the vibration generator 2330 provided at each of the first and second vibration generating modules 300-1 and 300-2 of the vibration generating device 300. For example, with respect to the first direction X, a horizontal cross-sectional length of the communication hole 710 may be 40% or less of a horizontal cross-sectional length of the bobbin 332 or the magnet member 333. When the horizontal cross-sectional length of the communication hole 710 is greater than 40%, a balance between a sound transferred (or propagated) to the display module 100 and a sound reflected in the first gap space GS1 may not be maintained, and due to this, a sound output characteristic of the vibration generating device 300 may be reduced. For example, the communication hole 710 may be omitted.

The plate 700 according to an embodiment of the present disclosure may be connected or coupled to a first portion 151 of the second supporting member 150 to cover the hole 157 of the second supporting member 150 by a third connection member 600.

The third connection member 600 may be disposed between the first portion 151 of the second supporting member 150 and a periphery portion of the plate 700. The third connection member 600 may place or couple the plate 700 at or to the first portion 151 of the second supporting member 150. The third connection member 600 may include a double-sided tape, a double-sided foam tape, a double-sided foam pad, or a double-sided foam pad tape, which includes an adhesive resin or an adhesive layer, but embodiments of the present disclosure are not limited thereto. The adhesive resin or the adhesive layer of the third connection member 600 according to an embodiment of the present disclosure may include an acryl-based or a urethane-based adhesive material, but embodiments of the present disclosure are not limited thereto. For example, the adhesive resin or the adhesive layer of the third connection member 600 may include the urethane-based adhesive material having a relatively ductile characteristic compared to the acryl-based adhesive material having a characteristic which is relatively high in hardness, for preventing or minimizing the transfer of a vibration of the display module 100 to the structure 2310.

Except for that the vibration generating device 300 is supported at or connected to the plate 700 by the second connection member 400, the vibration generating device 300 may be substantially the same as the vibration generating device 300 illustrated in FIGS. 3 to 10, and thus, its repetitive description is omitted or will be briefly given below.

In the vibration generating device 300, the structure 2310 of each of the first and second vibration generating modules 300-1 and 300-2 may be disposed on the plate 700 by the second connection member 400. For example, the structure 2310 of each of the first and second vibration generating modules 300-1 and 300-2 may be supported at (or connected to) the plate 700 by the second connection member 400.

In the vibration generating device 300, the vibration generator 2330 of each of the first and second vibration generating modules 300-1 and 300-2 may be disposed at a corresponding structure 2310 and may output a sound toward the plate 700 and the communication hole 710 of the plate 700. A portion of a sound output from the vibration generator 2330 may be transferred to a rear surface of the display module 100 through each of the communication hole 710 of the plate 700 and the hole 157 of the second supporting member 150, and the other portion of the sound output from the vibration generator 2330 may be reflected in the lateral direction of the display module 100 in the first gap space GS1 between the plate 700 and the vibration generator 2330 and a second gap space GS2 between the plate 700 and a sound guide portion 2313 of the structure 2310 and may be output in the forward direction of the display module 100 through a sound emission port 2316 of the structure 2310.

The second connection member 400 may be disposed between the plate 700 and the structure 2310 and may be disposed or couple the structure 2310 at or to the plate 700. The second connection member 400 may include a double-sided tape, a double-sided foam tape, a double-sided foam pad, or a double-sided foam pad tape, which includes an adhesive resin or an adhesive layer, but embodiments of the present disclosure are not limited thereto.

Therefore, the display apparatus according to another embodiment of the present disclosure may have an effect which is the same as or similar to the display apparatus illustrated in FIGS. 8 and 9. Also, because the display apparatus according to another embodiment of the present disclosure includes the second supporting member 150, including the hole 157 overlapping a magnetic field region of the vibration generating device 300, and the plate 700 disposed between the second supporting member 150 and the vibration generating device 300, the magnetic field distortion of the vibration generating device 300 caused by the second supporting member 150 may be prevented or minimized, and thus, a sound output characteristic of the vibration generating device 300 may be enhanced. Therefore, a sound output characteristic based on a vibration of the vibration generating device 300 may be enhanced. Also, because the display apparatus according to another embodiment of the present disclosure further includes the communication hole 710 which is disposed at the plate 700 to overlap the hole 157 of the second supporting member 150 and to overlap half or less of a magnetic field region formed in the vibration generating device 300, a sound balance may be maintained between a forward sound, traveling in the forward direction of the display module 100, and a lateral sound, traveling in the lateral direction of the display module 100, among sounds generated in the vibration generating device 300, thereby more enhancing a sound output characteristic of the vibration generating device 300. Accordingly, a sound output characteristic based on a vibration of the vibration generating device 300 may be more enhanced.

Figure 12:
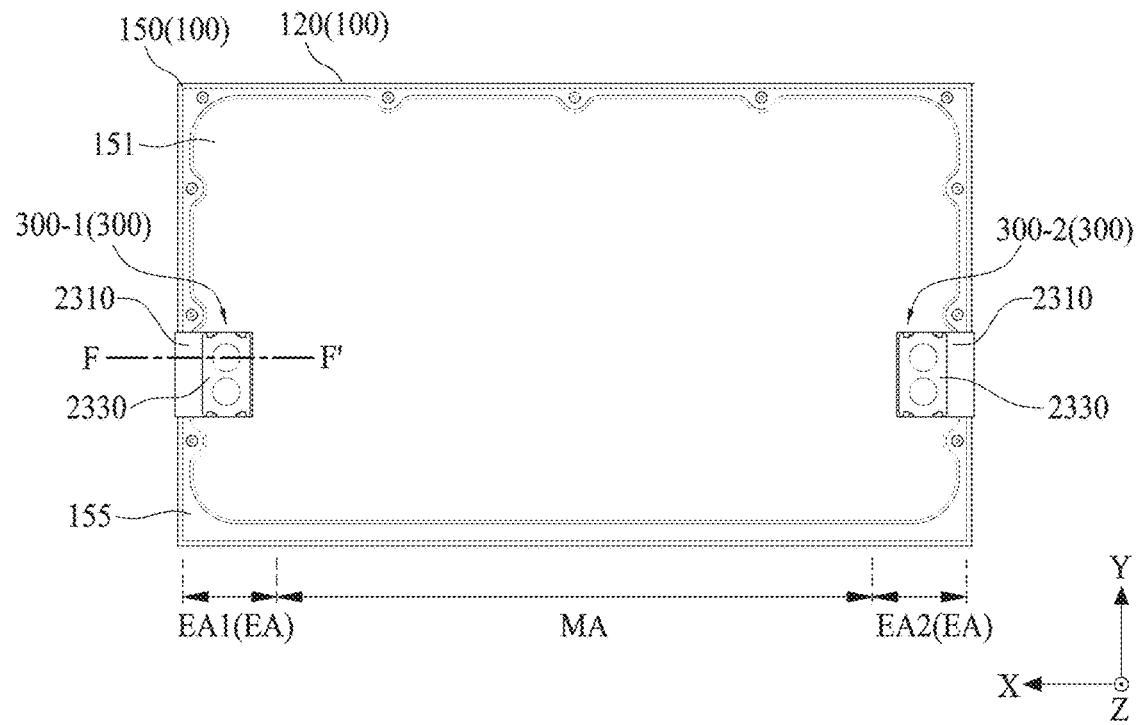
FIG. 12 illustrates a rear surface of a display apparatus according to another embodiment of the present disclosure.
Figure 13:
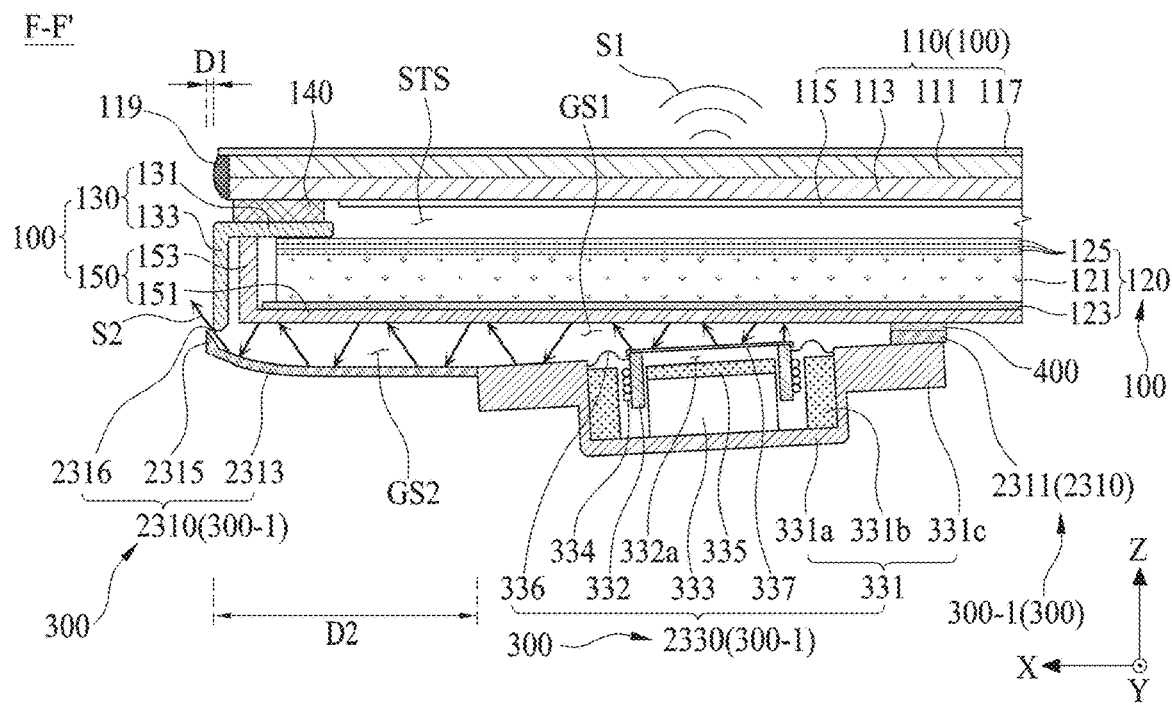
FIG. 13 is a cross-sectional view taken along line F-F' illustrated in FIG. 12.

FIG. 12 illustrates a rear surface of a display apparatus according to another embodiment of the present disclosure, and FIG. 13 is a cross-sectional view taken along line F-F' illustrated in FIG. 12. The drawings illustrate an embodiment where a structure is modified in the display apparatus illustrated in FIGS. 3 to 5. In the following description, therefore, a structure will be described in detail, the other elements are referred to by the same reference numerals as FIGS. 3 to 5, and their repetitive descriptions are omitted or will be briefly given.

With reference to FIGS. 12 and 13, in the display apparatus according to another embodiment of the present disclosure, a structure 2310 may further include a sound emission portion 2315.

The sound emission portion 2315 may be provided at one side or an end of the sound guide portion 2313 in parallel with a second direction Y. The sound emission portion 2315 may be configured to output a sound S2, traveling via the sound guide portion 2313, in the forward direction of the display module 100.

The sound emission portion 2315 according to an embodiment of the present disclosure may be configured to protrude from one side of the sound guide portion 2313. For example, the sound emission portion 2315 may be configured to protrude from an end of the sound guide portion 2313 along a thickness direction Z of the display module. The sound emission portion 2315 may include an inclined surface which reflects a sound S2, traveling via the sound guide portion 2313, toward the sound emission port 2316. For example, the sound emission portion 2315 may have a cross-sectional structure having a triangular shape. A vertex of the sound emission portion 2315 having a cross-sectional structure of a triangular shape may be spaced apart from the side surface of the display module 100 so as to output the sound S2. For example, the sound emission portion 2315 may be referred to as a protrusion portion, a triangular protrusion portion, a voice discharge portion, a voice emission portion, a triangular protrusion tip, a sound emission tip, or a sound discharge tip, but embodiments of the present disclosure are not limited thereto. The sound emission portion 2315 may reflect the sound S2, traveling via the sound guide portion 2313 through the inclined surface or the triangular protrusion portion, toward the sound emission port 2316 to increase the sound S2 output in the lateral direction of the display module 100 or to increase an output efficiency of the sound S2.

The sound emission port 2316 of the structure 2310 may be disposed between the sound emission portion 2315 and the display module 100 along a second direction Y. For example, the sound emission port 2316 may include a slit or a slot shape which extends along a second direction Y between the sound emission portion 2315 and the display module 100.

Therefore, in the display apparatus according to another embodiment of the present disclosure, at least a portion of a sound of the high-pitched sound band among sounds generated based on a vibration of the vibration generating device 300 may be guided in the lateral direction of the display module 100 by the structure 2310 of the vibration generating device 300 and may be output in the lateral direction and the forward direction of the display module 100, and thus, a sound characteristic of the high-pitched sound band may be further enhanced due to an increase in a sound S2 output in the lateral direction of the display module 100 by the sound emission portion 2315. Also, in the display apparatus according to another embodiment of the present disclosure, a thickness of the sound guide portion 2313 of the structure 2310 provided in the vibration generating device 300 may be reduced, and thus, a thickness of a periphery portion, overlapping the periphery region EA, of the display module 100 may be more reduced. For example, in the display apparatus according to another embodiment of the present disclosure, a thickness of the periphery region EA of the display module 100 may be reduced by the structure 2310 having a round shape.

Figure 14:
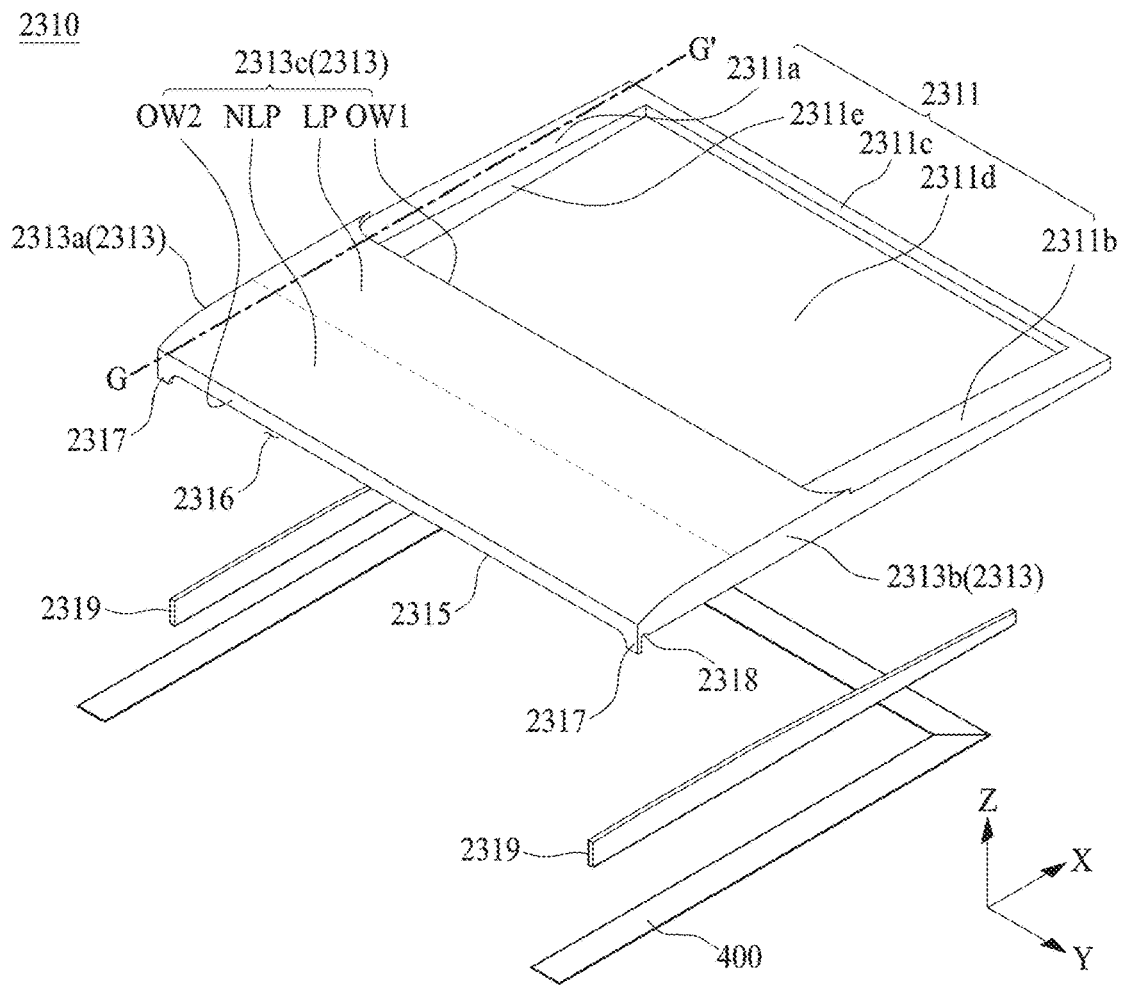
FIG. 14 illustrates a structure illustrated in FIGS. 12 and 13.
Figure 15:
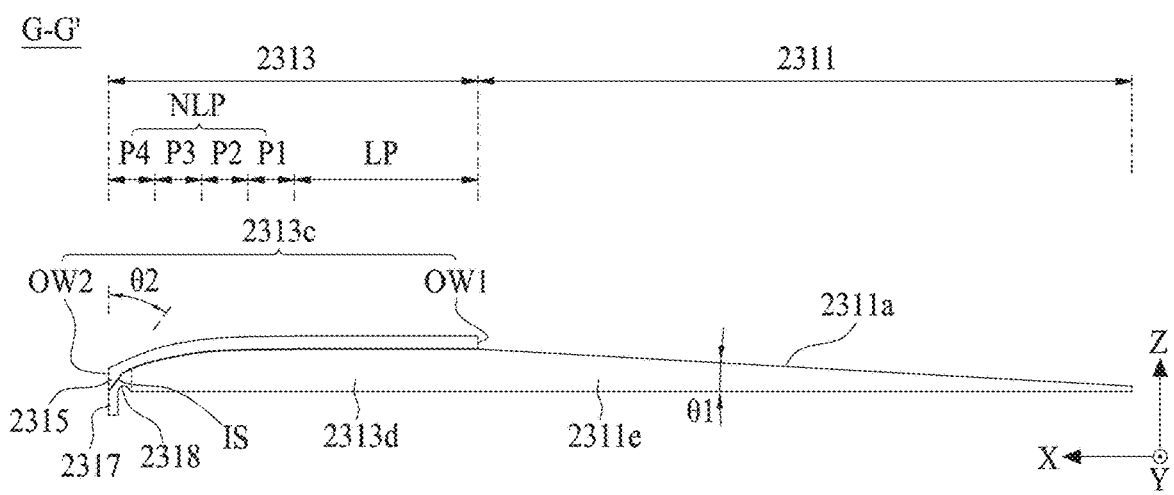
FIG. 15 is a cross-sectional view taken along line G-G' illustrated in FIG. 14.

FIG. 14 illustrates a structure illustrated in FIGS. 12 and 13, and FIG. 15 is a cross-sectional view taken along line G-G' illustrated in FIG. 14.

With reference to FIGS. 13 to 15, a structure 2310 according to another embodiment of the present disclosure may include a supporting portion 2311, a sound guide portion 2313, a sound emission portion 2315, and a sound emission port 2316.

Each of the supporting portion 2311 and the sound guide portion 2313 may be substantially the same as each of the supporting portion 2311 and the sound guide portion 2313 described above with reference to FIGS. 6 and 7, and thus, its repetitive description is omitted.

The sound emission portion 2315 may be configured to protrude from an end of the sound guide portion 2313 along a third direction Z. As described above, the sound emission portion 2315 may be configured to output a sound S2, which is reflected in the first gap space GS1 and the second gap space GS2 and travels in the lateral direction of the display module 100, in the forward direction of the display module 100.

The sound emission portion 2315 may be parallel to the second direction Y and may protrude toward the rear surface of the display module 100 from an end of the sound guide portion 2313 along the third direction Z. For example, the sound emission portion 2315 may protrude from an inner surface of the cover portion 2313c of the sound guide portion 2313 overlapping the side surface of the display module 100. The sound emission portion 2315 may be configured to cover a portion of a space (or a gap) between the rear surface of the display module 100 and the end of the sound guide portion 2313. The sound emission portion 2315 may be spaced apart from the side surface of the display module 100.

The sound emission portion 2315 according to an embodiment of the present disclosure may include a second surface OW2 and a third surface IS. The second surface OW2 may be exposed to the outside of the side surface of the display module 100. The second surface OW2 may be parallel to the third direction Z. The second surface OW2 of the sound emission portion 2315 may extend from the second surface OW2 of the cover portion 2313c along the third direction Z.

For example, the second surface OW2 may be an outer sidewall or an outer side surface. The third surface IS may be inclined from the end of the second surface OW2 adjacent to the display module 100. For example, the third surface IS may be an inner surface or an inner side surface.

According to an embodiment of the present disclosure, the sound emission portion 2315 may include a triangular cross-sectional structure where the third surface IS is a sloped surface. An angle θ2 between the second surface OW2 and the third surface IS of the sound emission portion 2315 may be adjusted to a range of 45 degrees to 75 degrees so that a sound S2 traveling via the sound guide portion 2313 is smoothly output in the forward direction of the display module 100 through the sound emission port 2316. For example, the angle θ2 between the second surface OW2 and the third surface IS of the sound emission portion 2315 may be adjusted to a range of 55 degrees to 65 degrees. For example, the sound emission portion 2315 may include a protrusion portion having an angle between 45 degrees and 75 degrees. The protrusion portion may include a triangular protrusion portion (or a protrusion portion or a triangular protrusion tip or a sound emission portion or a sound emission tip).

According to an embodiment of the present disclosure, with respect to the first direction X, a distance D1 between the second surface OW2 of the sound emission portion 2315 and the one side or the side surface of the display module 100 may be about 1±0.5 mm, so that the sound S2 traveling via the sound guide portion 2313 is smoothly output in the forward direction of the display module 100 through the sound emission port 2316. For example, with respect to the first direction X, a distance D1 between the second surface OW2 of the sound emission portion 2315 and one side or a side surface of the panel guide 130 may be about 1±0.5 mm.

According to an embodiment of the present disclosure, with respect to the third direction Z, a shortest distance between the second surface OW2 of the sound emission portion 2315 and the display module 100 may be about ±0.5 mm, so that the sound S2 traveling via the sound guide portion 2313 is smoothly output in the forward direction of the display module 100 through the sound emission port 2316. For example, with respect to the third direction Z, a shortest distance between the second surface OW2 of the sound emission portion 2315 and the one side or the side surface of the panel guide 130 may be about ±0.5 mm.

The sound emission port 2316 may be configured between the sound emission portion 2315 and the display module 100 along the second direction Y. For example, the sound emission port 2316 may be a separation space between the sound emission portion 2315 and the panel guide 130. For example, the sound emission port 2316 may include a slit or a slot shape which extends along the second direction Y between the sound emission portion 2315 and the panel guide 130, but embodiments of the present disclosure are not limited thereto.

According to another embodiment of the present disclosure, the structure 2310 may further include a pair of protrusion portions 2317, protruding from both end corner portions or both side corner portions of the sound guide portion 2313 along the third direction Z, and a concave portion 2318 which is formed concavely between each of the pair of protrusion portions 2317 and each of the first extension portion 2313a and the second extension portion 2313b of the sound guide portion 2313. The elements may be as described above with reference to FIGS. 4 to 7, and thus, their repetitive descriptions are omitted.

The structure 2310 according to another embodiment of the present disclosure may further include a sound anti-reflection member (or a sound reflection prevention member) 2319 which is disposed at each of a third surface (or an inner surface) 2311e, 2311d of each of the supporting portion 2311 the sound guide portion 2313, which are parallel to the first direction X. The element may be as described above with reference to FIGS. 4 to 7, and thus, their repetitive descriptions are omitted.

Therefore, the structure 2310 according to another embodiment of the present disclosure may reflect the sound S2, traveling via the sound guide portion 2313 through the sound emission portion 2315 including the inclined surface or the protrusion portion (or a triangular protrusion portion), toward the sound emission port 2316 to increase the sound S2 output in the lateral direction of the display module 100 or to increase an output efficiency of the sound S2.

Figure 16:
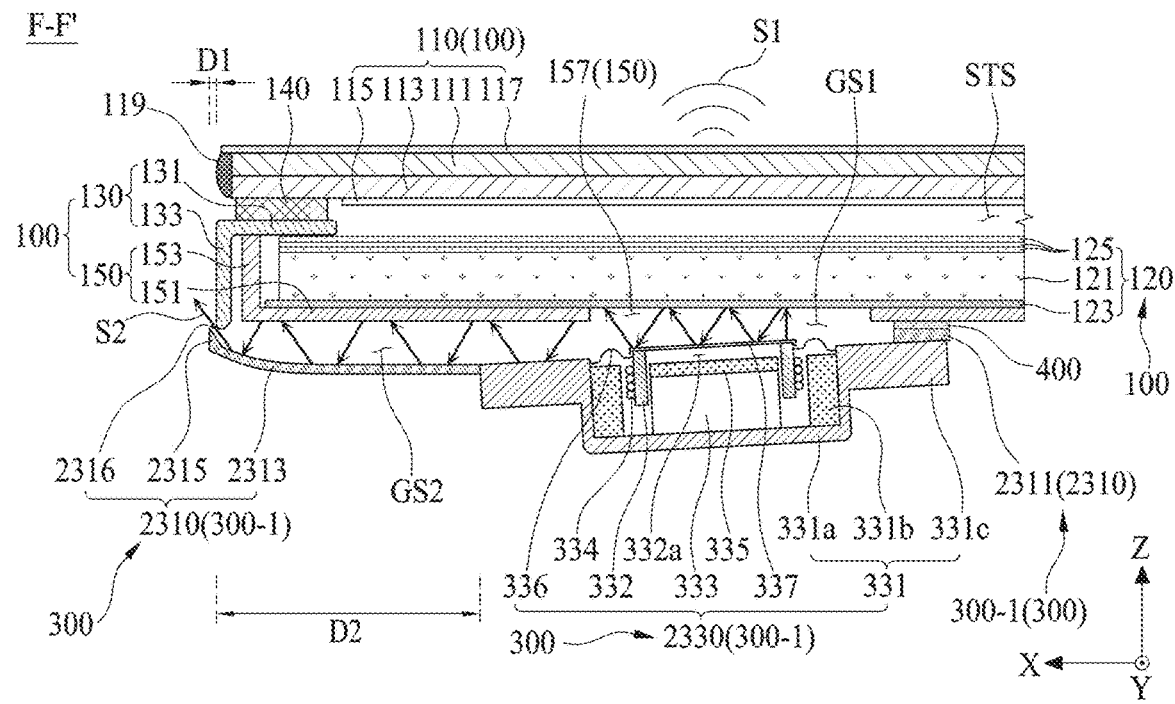
FIG. 16 is another cross-sectional view taken along line F-F' illustrated in FIG. 12.

FIG. 16 is another cross-sectional view taken along line F-F' illustrated in FIG. 12 and illustrates an embodiment where a structure of the second supporting member in the display apparatus illustrated in FIGS. 12 to 15 has been modified. Hereinafter, therefore, a second supporting member will be described in detail, the other elements are referred to by the same reference numerals as FIGS. 12 to 15, and their repetitive descriptions are omitted or will be briefly given.

With reference to FIGS. 12 and 16, in a display apparatus according to another embodiment of the present disclosure, a second supporting member 150 may further include at least one hole 157 which overlaps a vibration generating device 300. For example, the second supporting member 150 may include a material including ferrous metal described above.

According to an embodiment of the present disclosure, the hole 157 may be provided at a first portion 151 of the second supporting member 150 to overlap a magnetic field region of the vibration generating device 300. The hole 157 may be provided at the first portion 151 of the second supporting member 150 so as to overlap a bobbin 332 or a magnet member 333 of a vibration generator 2330, to prevent or minimize a phenomenon where a magnetic field generated in the vibration generating device 300 is distorted by the second supporting member 150 including a metal material. The hole 157 may be substantially the same as the hole 157 described above with reference to FIGS. 8 and 9, and thus, its repetitive description is omitted.

According to another embodiment of the present disclosure, the hole 157 may have a size which is greater than that of the bobbin 332 or the magnet member 333 of the vibration generator 2330. For example, the hole 157 may have a size which is less than a total size of the vibration generator 2330. For example, the hole 157 may have a size which is greater than or equal to that of the opening portion 2311d disposed at the supporting portion 2311 of the structure 2310 illustrated in FIG. 14 and less than that of the supporting portion 2311 of the structure 2310. For example, the first portion 151 of the second supporting member 150 may be configured to overlap the sound guide portion 2313 of the structure 2310, and thus, a sound of the high-pitched sound band reflected (or diffracted) in a second gap space GS2 between the sound guide portion 2313 of the structure 2310 and the first portion 151 of the second supporting member 150 including a metal material may increase, thereby enhancing an output characteristic of a sound which is output in the lateral direction of the display module 100.

Therefore, in the display apparatus according to another embodiment of the present disclosure, at least a portion of a sound of the high-pitched sound band among sounds generated based on a vibration of the vibration generating device 300 may be guided in the lateral direction of the display module 100 by the structure 2310 of the vibration generating device 300 and may be output in the lateral direction and the forward direction of the display module 100, and thus, a sound characteristic of the high-pitched sound band may be enhanced by a sound S2 output in the lateral direction of the display module 100. Also, because the display apparatus according to another embodiment of the present disclosure includes the second supporting member 150 including the hole 157 overlapping the magnetic field region of the vibration generating device 300, the distortion of a magnetic field of the vibration generating device 300 caused by the second supporting member 150 may be prevented or minimized, and thus, a sound output characteristic of the vibration generating device 300 may be enhanced. Accordingly, a sound output characteristic based on a vibration of the vibration generating device 300 may be enhanced.

Figure 17:
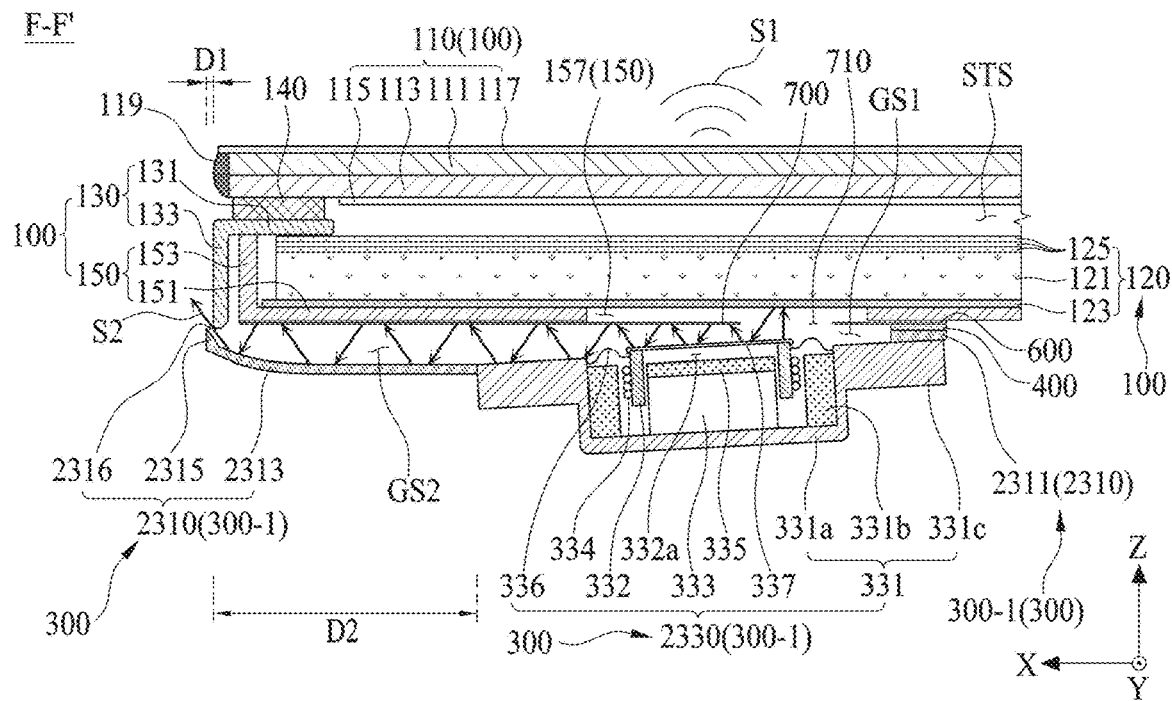
FIG. 17 is another cross-sectional view taken along line F-F' illustrated in FIG. 12.

FIG. 17 is another cross-sectional view taken along line F-F' illustrated in FIG. 12 and illustrates an embodiment where a plate is additionally provided in the display apparatus illustrated in FIG. 16. In the following description, therefore, a plate will be described in detail, the other elements are referred to by the same reference numerals as FIGS. 12 to 16, and their repetitive descriptions are omitted or will be briefly given.

With reference to FIGS. 12 and 17, a display apparatus according to another embodiment of the present disclosure may further include a plate 700 disposed between a display module 100 and a vibration generating device 300.

The plate 700 may be disposed between a second supporting member 150 and the vibration generating device 300. For example, the plate 700 may be disposed between each of first and second vibration generating modules 300-1 and 300-2 of the vibration generating device 300 and a first portion 151 of the second supporting member 150. The plate 700 may include a material which differs from that of the second supporting member 150. The plate 700 according to an embodiment of the present disclosure may include nonferrous metal. For example, when the plate 700 includes a ferrous metal material, distortion of a magnetic field generated in the vibration generating device 300 may occur. To prevent or decrease the magnetic field distortion of the vibration generating device 300 caused by the plate 700, the plate 700 may include a nonferrous metal material. The plate 700 may be substantially the same as the plate described above with reference to FIGS. 10 and 11, and thus, its repetitive description is omitted.

The plate 700 according to an embodiment of the present disclosure may further include a communication hole 710.

The communication hole 710 may overlap a hole 157 disposed at the second supporting member 150. The communication hole 710 may communicate the hole 157 disposed at the second supporting member 150 and the first gap space GS1. According to an embodiment of the present disclosure, to maintain a balance of a sound generated in the vibration generating device 300, the communication hole 710 may overlap only a portion of a magnetic field region formed in the vibration generating device 300. The communication hole 710 may overlap half or less of the magnetic field region formed in the vibration generating device 300. For example, with respect to the first direction X, a horizontal cross-sectional length of the communication hole 710 may be 40% or less of a horizontal cross-sectional length of a bobbin 332 or a magnet member 333. The communication hole 710 may be substantially the same as the communication hole described above with reference to FIGS. 10 and 11, and thus, its repetitive description is omitted. For example, the communication hole 710 may be omitted.

Therefore, the display apparatus according to another embodiment of the present disclosure may have an effect which is the same as or similar to the display apparatus illustrated in FIG. 16. Also, because the display apparatus according to another embodiment of the present disclosure includes the second supporting member 150, including the hole 157 overlapping a magnetic field region of the vibration generating device 300, and the plate 700 disposed between the second supporting member 150 and the vibration generating device 300, the magnetic field distortion of the vibration generating device 300 caused by the second supporting member 150 may be prevented or minimized, and thus, a sound output characteristic of the vibration generating device 300 may be enhanced. Therefore, a sound output characteristic based on a vibration of the vibration generating device 300 may be enhanced. Also, because the display apparatus according to another embodiment of the present disclosure further includes the communication hole 710 which is disposed at the plate 700 to overlap the hole 157 of the second supporting member 150 and to overlap half or less of a magnetic field region formed in the vibration generating device 300, a sound balance may be maintained between a forward sound, traveling in the forward direction of the display module 100, and a lateral sound, traveling in the lateral direction of the display module 100, among sounds generated in the vibration generating device 300, thereby more enhancing a sound output characteristic of the vibration generating device 300. Accordingly, a sound output characteristic based on a vibration of the vibration generating device 300 may be more enhanced.

Figure 18:
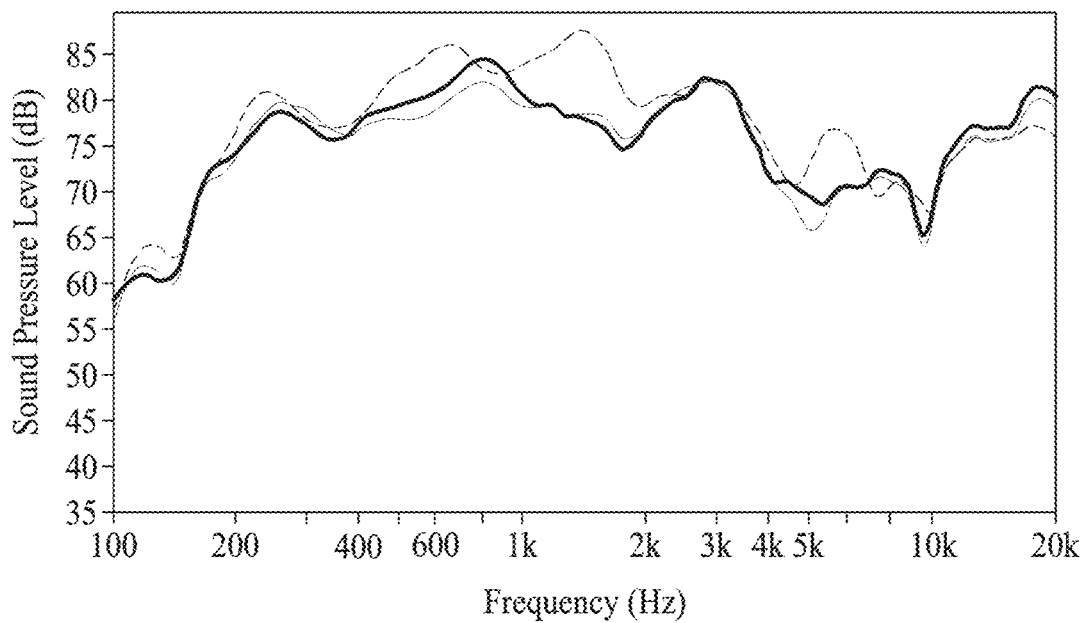
FIG. 18 is a graph showing a sound output characteristic of a display apparatus according to an embodiment of the present disclosure, a sound output characteristic of a display apparatus according to a first comparative example, and a sound output characteristic of a display apparatus according to a second comparative example.

FIG. 18 is a graph showing a sound output characteristic of a display apparatus according to an embodiment of the present disclosure, a sound output characteristic of a display apparatus according to a first comparative example, and a sound output characteristic of a display apparatus according to a second comparative example. In FIG. 18, a thick solid line represents a frequency-sound pressure level characteristic of the display apparatus according to an embodiment of the present disclosure illustrated in FIG. 10 to which a plate is applied without a communication hole, a dotted line represents a frequency-sound pressure level characteristic of a display apparatus (or the display apparatus of the first comparative example) including a vibration generator which is adjacent to a side surface of the second supporting member by less than 3 mm without a structure according to an embodiment of the present disclosure and is disposed in parallel with a rear surface of the second supporting member, and a thin solid line represents a frequency-sound pressure level characteristic of a display apparatus (or the display apparatus of the second comparative example) to which a structure including a sound guide portion configured with only a linear portion without a nonlinear portion is applied. In FIG. 18, the abscissa axis represents a frequency (Hz), and the ordinate axis represents a sound pressure level (dB). In the sound pressure level measurement of FIG. 18, Audio Precision company's APX525 has been used, an applied voltage is 3 Vrms, a sine sweep has been applied at 20 Hz to 20 kHz, and a sound pressure level has been measured at a position being spaced apart from a display panel by 0.5 m. The sine sweep may be a process of performing a sweep for a short time, but a process is not limited thereto.

With reference to FIG. 18, comparing with the display apparatus of the first comparative example, in the display apparatus according to an embodiment of the present disclosure, a sound pressure level characteristic may be slightly reduced in a pitched sound band of 200 Hz to 20 kHz, but the display apparatus according to an embodiment of the present disclosure may have a sound pressure level characteristic of about 68 dB or more in a pitched sound band of 200 Hz to 5 kHz and a sound pressure level characteristic of about 63 dB or more in a pitched sound band of 5 kHz to 20 kHz. Also, it may be seen that the display apparatus according to an embodiment of the present disclosure is better in sound pressure level characteristic than the display apparatus of the second comparative example, and for example, a sound pressure level is enhanced in a pitched sound band of 400 Hz to 1 kHz and a pitched sound band of 3 kHz or more. Accordingly, the display apparatus according to an embodiment of the present disclosure may output a sound having a sound pressure level characteristic of about 63 dB or more in a pitched sound band of 200 Hz to 20 kHz.

Therefore, in the display apparatus according to an embodiment of the present disclosure, it may be seen that a sound of the high-pitched sound band is enhanced. For example, the present disclosure may provide a display apparatus including a vibration generating device, which may output a sound of the high-pitched sound band even without configuring a piezoelectric vibration device where an output of the high-pitched sound band is strong. Accordingly, the embodiments of the present disclosure may provide a display apparatus including a vibration generating device, which may enhance a sound of the low-pitched sound band to the high-pitched sound band.

A display apparatus according to an embodiment of the present disclosure may be applied to various applications which output a sound based on a vibration of a display module without a separate speaker. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the vibration generating device according to the present disclosure may be applied to organic light emitting lighting apparatuses or inorganic light emitting lighting apparatuses. When the vibration generating device of the present disclosure is applied to a lighting apparatuses, the vibration generating device may act as lighting and a speaker. Also, when the display apparatus of the present disclosure is applied to a mobile device, the vibration generating device may act as one or more of a speaker, a receiver, and a haptic, but embodiments of the present disclosure are not limited thereto.

A display apparatus according to an embodiment of the present disclosure will be described below.

According to an embodiment of the present disclosure, a display apparatus may include a display module including a display panel configured to display an image, a structure at a rear surface of the display module, and a vibration generator at the structure. The structure may include a nonlinear portion to cover a periphery of the rear surface of the display module along a first direction and a sound emission port spaced apart from the rear surface of the display module.

According to an embodiment of the present disclosure, a display apparatus may include a display module including a display panel configured to display an image, and a vibration generating device including a structure at a rear surface of the display module and a vibration generator at the structure. The structure includes a nonlinear portion to cover a periphery of the rear surface of the display module along a first direction and a sound emission port spaced apart from the rear surface of the display module.

According to some embodiments of the present disclosure, the vibration generator may be in nonparallel with the rear surface of the display module. For example, the vibration generator may be supported at the structure so that the vibration generator is nonparallel to the rear surface of the display module.

According to some embodiments of the present disclosure, the structure may include a supporting portion configured to support the vibration generator, and a sound guide portion extending from the supporting portion to one side of the display module and including the nonlinear portion, and the sound emission port may be between one side of the nonlinear portion and the rear surface of the display module. For example, the sound guide portion may extend from the supporting portion to a side surface of the display module along a first direction so as to cover a rear periphery portion of the display module. For example, the sound emission port may be disposed between the one end of the nonlinear portion and the rear surface of the display module.

According to some embodiments of the present disclosure, the structure may be at the rear surface of the display module, and the supporting portion may include an opening portion overlapping the vibration generator. For example, the structure may be disposed at the rear surface of the display module by a connection member.

According to some embodiments of the present disclosure, the nonlinear portion may include a cross-sectional structure having a curved shape.

According to some embodiments of the present disclosure, the structure may provide a first gap space between the rear surface of the display module and the vibration generator, and a second gap space between the nonlinear portion and the rear surface of the display module. The first gap space and the second gap space may be communicated with the sound emission port.

According to some embodiments of the present disclosure, at least a portion of a sound output from the vibration generator may be reflected in a lateral direction of the display module by the nonlinear portion, and may be output in a forward direction of the display module through the sound emission port.

According to some embodiments of the present disclosure, the vibration generating device may include a first vibration generating module at a first region of a rear surface of the display module and including the structure and the vibration generator, and a second vibration generating module at a second region of the rear surface of the display module and including the structure and the vibration generator.

According to an embodiment of the present disclosure, a display apparatus may include a display module including a display panel configured to display an image, a first vibration generating module at a first region of a rear surface of the display module, and a second vibration generating module at a second region of the rear surface of the display module. Each of the first and second vibration generating modules may include a vibration generator configured to output a sound to the rear surface of the display module, and a structure configured to support the vibration generator. The structure may include a nonlinear portion guiding a sound output from the vibration generator to one side of the display module and a sound emission port spaced apart from the rear surface of the display module.

According to some embodiments of the present disclosure, the structure may be disposed at the rear surface of the display module, and the vibration generator may be in nonparallel with the rear surface of the display module. For example, the vibration generator may be supported at the structure so that the vibration generator is nonparallel to the rear surface of the display module.

According to some embodiments of the present disclosure, the structure may include a supporting portion configured to support the vibration generator, and a sound guide portion extending from the supporting portion to one side of the display module and including the nonlinear portion. The sound emission port may be between one side of the nonlinear portion and the rear surface of the display module. For example, the sound guide portion may extend from the supporting portion to a side surface of the display module along a first direction so as to cover a rear periphery portion of the display module. For example, the sound emission port may be disposed between the one end of the nonlinear portion and the rear surface of the display module.

According to some embodiments of the present disclosure, the structure may further include a sound emission portion protruding from one side of the nonlinear portion, and the sound emission port may be between one side of the nonlinear portion and a side surface of the display module. For example, the structure may be disposed along the thickness direction of the display module. For example, the sound emission portion may protrude from the end of the nonlinear portion. For example, the sound emission port may be disposed between the one end of the sound emission portion and the rear surface of the display module.

According to some embodiments of the present disclosure, the sound emission portion may include a protrusion portion. For example, the protrusion portion may have a cross-sectional structure having a triangular shape. For example, the sound emission portion may include a triangular protrusion tip.

According to some embodiments of the present disclosure, the sound emission portion may include a first surface protruding from one side of the sound guide portion along the thickness direction of the display module and exposed to the outside of one side of the display module, and a second surface inclined from one side of the first surface adjacent to the display module.

According to some embodiments of the present disclosure, in the sound emission portion, an angle between the first surface and the second surface may be between 45 degrees and 75 degrees.

According to some embodiments of the present disclosure, a distance between the first surface of the sound emission portion and the one side of the display module may be about 1±0.5 mm, with respect to a first direction X, or a shortest distance between the first surface of the sound emission portion and the display module may be about ±0.5 mm, with respect to the thickness direction of the display module.

According to some embodiments of the present disclosure, a distance between the rear surface of the display module and the vibration generator may increase progressively toward one side of the display module adjacent to the vibration generator along the first direction. For example, the distance between the rear surface of the display module and the vibration generator may increase progressively toward a side surface (or a lateral surface) of the display module adjacent to the vibration generator along the first direction.

According to some embodiments of the present disclosure, a distance between the rear surface of the display module and the nonlinear portion of the structure may decrease progressively toward one side of the display module adjacent to the structure along the first direction. For example, the distance between the rear surface of the display module and the nonlinear portion of the structure may decrease progressively toward a side surface (or a lateral surface) of the display module adjacent to the structure along the first direction.

According to some embodiments of the present disclosure, the nonlinear portion of the structure may include a plurality of curved portions having different curvature radiuses.

According to some embodiments of the present disclosure, the nonlinear portion of the structure may include a plurality of curved portions, and the curvature radius of each of the plurality of curved portions may decrease progressively toward one side of the display module adjacent to the structure. For example, the curvature radius of each of the plurality of curved portions may decrease progressively toward a side surface (or a lateral surface) of the display module adjacent to the structure.

According to some embodiments of the present disclosure, a length of the sound guide portion may be longer than half of a length of the vibration generator and shorter than a total length of the vibration generator, with respect to the first direction.

According to some embodiments of the present disclosure, the sound guide portion may further include a linear portion between the supporting portion and the nonlinear portion, and a length of the nonlinear portion and a length of the linear portion may be the same or different with respect to the first direction.

According to some embodiments of the present disclosure, the supporting portion may include a first supporting portion disposed along the first direction and configured to support a first side of the vibration generator, a second supporting portion disposed in parallel with the first supporting portion and configured to support a second side of the vibration generator, a third supporting portion disposed between one side of the first supporting portion and one side of the second supporting portion and configured to support a third side of the vibration generator, and an opening portion surrounded by the first to third supporting portions. For example, the third supporting portion may be disposed along a second direction crossing the first direction. For example, the opening may overlap the vibration generator.

According to some embodiments of the present disclosure, each of the first supporting portion and the second supporting portion may include a first surface adjacent and/or parallel with to the rear surface of the display module, and a second surface nonparallel to the rear surface of the display module. For example, the second surface may support the vibration generator.

According to some embodiments of the present disclosure, in each of the first supporting portion and the second supporting portion, a distance between the first surface and the second surface may increase progressively from the third supporting portion to the sound guide portion along the first direction.

According to some embodiments of the present disclosure, the sound guide portion may include a first extension portion extending from the first supporting portion to one side of the display module along the first direction, a second extension portion extending from the second supporting portion to the one side of the display module, and a cover portion covering a space between the first extension portion and the second extension portion. For example, the second extension portion may be disposed to be parallel to the first extension portion. For example, the cover portion may include the nonlinear portion.

According to some embodiments of the present disclosure, the structure may further include a sound absorption member disposed at a third surface (or an inner surface) of each of the first and second supporting portions and a third surface (or an inner surface) of each of the first and second extension portions.

According to some embodiments of the present disclosure, the structure may further include a sound absorption member disposed on an inner surface of each of the first and second supporting portions and an inner surface of each of the first and second extension portions.

According to some embodiments of the present disclosure, the display module may further include comprises a supporting member on the rear surface of the display panel, and the structure is disposed at a rear surface of the supporting member, and the supporting member may include a first hole, and the first hole overlaps the vibration generator. For example, the structure may be disposed at a rear surface of the supporting member, and the first hole of the supporting member may overlap the vibration generator.

According to some embodiments of the present disclosure, the display apparatus may further include a plate between the supporting member and the structure and configured to cover at least a portion of the first hole of the supporting member. For example, the plate may support the structure.

According to some embodiments of the present disclosure, the plate may include a nonferrous metal.

According to some embodiments of the present disclosure, the plate may further include a second hole overlapping the first hole of the supporting member.

According to some embodiments of the present disclosure, the size of the second hole may be less than that of the first hole.

According to some embodiments of the present disclosure, the vibration generator may include a module frame in the structure, a bobbin on the module frame, a magnet inside or outside the bobbin, a coil wound around the bobbin, and a damper connected between the module frame and the bobbin.

According to some embodiments of the present disclosure, the display module may further include a supporting member on a rear surface of the display panel, and the structure is disposed at a rear surface of the supporting member, the supporting member may include a hole, and the first hole overlaps the bobbin. For example, the vibration generator may overlap the first hole of the supporting member. For example, the bobbin may overlap the first hole of the supporting member.

According to some embodiments of the present disclosure, a size of the first hole may be greater than a size of the bobbin.

According to some embodiments of the present disclosure, the display apparatus may further include a plate between the rear surface of the display module and the structure and configured to cover at least a portion of the first hole.

According to some embodiments of the present disclosure, the display apparatus may further include a plate between the rear surface of the display module and the structure, the display module may further include a supporting member on the rear surface of the display panel, and the supporting member may include a hole.

According to some embodiments of the present disclosure, the plate may include a second hole overlapping a portion of the bobbin. For example, the second hole of the plate may overlap the hole of the supporting member.

According to some embodiments of the present disclosure, the length of the second hole is 40% or less of a length of the bobbin, with respect to the first direction.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display apparatus, comprising:
   a display module including a display panel configured to display an image at a front surface;
   a structure at a rear surface of the display module; and
   a vibration generator at the structure,
   wherein the structure includes:
   a nonlinear portion to cover a periphery of the rear surface of the display module along a first direction;
   a sound emission port spaced apart from the rear surface of the display module;
   a supporting portion configured to support the vibration generator; and
   a sound guide portion extending from the supporting portion to one side of the display module and including the nonlinear portion,
   wherein the supporting portion includes an inclined surface inclined with respect to the rear surface of the display module,
   wherein the vibration generator is disposed on the inclined surface of the supporting portion so as to be nonparallel with the rear surface of the display module,
   wherein the vibration generator is in nonparallel with the rear surface of the display module,
   wherein a distance between the rear surface of the display module and the vibration generator increases progressively toward one side of the display module in a direction from a center region of the display module to a periphery region of the display module, and
   wherein a distance between the rear surface of the display module and the nonlinear portion of the structure decreases progressively toward one side of the display module adjacent to the structure along the first direction.

2. The display apparatus of claim 1,
   wherein the sound emission port is between one side of the nonlinear portion and the rear surface of the display module.

3. The display apparatus of claim 1, wherein the nonlinear portion includes a cross-sectional structure having a curved shape.

4. The display apparatus of claim 1, wherein:
the structure provides a first gap space between the rear surface of the display module and the vibration generator, and a second gap space between the nonlinear portion and the rear surface of the display module; and
the first gap space and the second gap space are connected to the sound emission port.

5. The display apparatus of claim 1, wherein:
the structure further comprises a sound emission portion protruding from one side of the nonlinear portion; and
the sound emission port is between the sound emission portion and a side surface of the display module.

6. The display apparatus of claim 1, wherein:
a thickness of the supporting portion is thickened progressively from a center of the display module toward the one side of the display module along the first direction.

7. The display apparatus of claim 1, wherein the nonlinear portion of the structure comprises a plurality of curved portions having different curvature radiuses.

8. The display apparatus of claim 1, wherein:
the nonlinear portion of the structure comprises a plurality of curved portions; and
a curvature radius of each of the plurality of curved portions decreases progressively toward the one side of the display module adjacent to the structure.

9. The display apparatus of claim 2, wherein a length of the sound guide portion is longer than half of a length of the vibration generator and shorter than a total length of the vibration generator, with respect to the first direction.

10. The display apparatus of claim 9, wherein:
the sound guide portion further comprises a linear portion between the supporting portion and the nonlinear portion; and
a length of the nonlinear portion and a length of the linear portion are the same or different with respect to the first direction.

11. The display apparatus of claim 2, wherein the supporting portion comprises:
a first supporting portion disposed along the first direction and configured to support a first side of the vibration generator;
a second supporting portion disposed in parallel with the first supporting portion and configured to support a second side of the vibration generator;
a third supporting portion disposed between one side of the first supporting portion and one side of the second supporting portion and configured to support a third side of the vibration generator; and
an opening portion surrounded by the first to third supporting portions.

12. The display apparatus of claim 11, wherein each of the first supporting portion and the second supporting portion comprises:
a first surface adjacent to and/or in parallel with the rear surface of the display module; and
a second surface nonparallel to the rear surface of the display module.

13. The display apparatus of claim 12, wherein, in each of the first supporting portion and the second supporting portion, a distance between the first surface and the second surface increases progressively from the third supporting portion to the sound guide portion along the first direction.

14. The display apparatus of claim 11, wherein the sound guide portion comprises:
a first extension portion extending from the first supporting portion to the one side of the display module along the first direction;
a second extension portion extending from the second supporting portion to the one side of the display module; and
a cover portion covering a space between the first extension portion and the second extension portion.

15. The display apparatus of claim 1, wherein:
the display module further comprises a supporting member on the rear surface of the display panel, and the structure is disposed at a rear surface of the supporting member; and
the supporting member comprises a first hole, and the first hole overlaps the vibration generator.

16. The display apparatus of claim 15, further comprising a plate between the supporting member and the structure and configured to cover at least a portion of the first hole of the supporting member.

17. The display apparatus of claim 1, wherein the vibration generator comprises:
a module frame in the structure;
a bobbin on the module frame;
a magnet inside or outside the bobbin;
a coil wound around the bobbin; and
a damper connected between the module frame and the bobbin.

18. The display apparatus of claim 17, wherein:
the display module further comprises a supporting member on a rear surface of the display panel, and the structure is disposed at a rear surface of the supporting member; and
the supporting member comprises a first hole, and the first hole overlaps the bobbin.

19. The display apparatus of claim 1, wherein:
the structure is configured to support the vibration generator and to guide a sound generated by the vibration generator to the sound emission port;
the sound emission port is at an edge of the structure;
the structure does not overlap with at least a half of a thickness of the display module along a thickness direction of the display module; and
the structure is not a part of an outermost product cover.

20. The display apparatus of claim 1, wherein:
the vibration generator comprises an electrical or magnetic component; and
the supporting portion comprises an opening portion that overlaps with the electrical or magnetic component of the vibration generator.

21. A display apparatus, comprising:
a display module including a display panel configured to display an image at a front surface;
a first vibration generating module at a first region of a rear surface of the display module; and
a second vibration generating module at a second region of the rear surface of the display module,
wherein each of the first and second vibration generating modules comprises:
a vibration generator configured to output a sound to the rear surface of the display module; and
a structure configured to support the vibration generator;
wherein the structure comprises:
a nonlinear portion guiding a sound output from the vibration generator to one side of the display module;
a sound emission port spaced apart from the rear surface of the display module;

a supporting portion configured to support the vibration generator; and
a sound guide portion extending from the supporting portion to the one side of the display module and including the nonlinear portion,
wherein the supporting portion includes an inclined surface inclined with respect to the rear surface of the display module,
wherein the vibration generator is disposed on the inclined surface of the supporting portion so as to be nonparallel with the rear surface of the display module,
wherein a distance between the rear surface of the display module and the vibration generator increases progressively toward one side of the display module in a direction from a center region of the display module to a periphery region of the display module, and
wherein a distance between the rear surface of the display module and the nonlinear portion of the structure decreases progressively toward the one side of the display module adjacent to the structure along a first direction.

22. The display apparatus of claim 21, wherein:
the structure further comprises a sound emission portion protruding from one side of the nonlinear portion; and
the sound emission port is between the sound emission portion and a side surface of the display module.

23. The display apparatus of claim 21,
wherein a thickness of the supporting portion is thickened progressively from a center of the display module toward the one side of the display module along the first direction.

24. The display apparatus of claim 21, wherein the nonlinear portion of the structure comprises a plurality of curved portions having different curvature radiuses.

25. The display apparatus of claim 21, wherein:
the nonlinear portion of the structure comprises a plurality of curved portions; and
a curvature radius of each of the plurality of curved portions decreases progressively toward the one side of the display module adjacent to the structure.

26. The display apparatus of claim 21,
wherein the sound emission port is between one side of the nonlinear portion and the rear surface of the display module.

27. The display apparatus of claim 26, wherein a length of the sound guide portion is longer than half of a length of the vibration generator and shorter than a total length of the vibration generator, with respect to the first direction.

28. The display apparatus of claim 27, wherein:
the sound guide portion further comprises a linear portion between the supporting portion and the nonlinear portion; and
a length of the nonlinear portion and a length of the linear portion are the same or different with respect to the first direction.

29. The display apparatus of claim 26, wherein the supporting portion comprises:
a first supporting portion disposed along the first direction and configured to support a first side of the vibration generator;
a second supporting portion disposed in parallel with the first supporting portion and configured to support a second side of the vibration generator;
a third supporting portion disposed between one side of the first supporting portion and one side of the second supporting portion and configured to support a third side of the vibration generator; and
an opening portion surrounded by the first to third supporting portions.

30. The display apparatus of claim 29, wherein each of the first supporting portion and the second supporting portion comprises:
a first surface adjacent to and/or in parallel with the rear surface of the display module; and
a second surface nonparallel to the rear surface of the display module.

31. The display apparatus of claim 30, wherein, in each of the first supporting portion and the second supporting portion, a distance between the first surface and the second surface increases progressively from the third supporting portion to the sound guide portion along the first direction.

32. The display apparatus of claim 29, wherein the sound guide portion comprises:
a first extension portion extending from the first supporting portion to the one side of the display module along the first direction;
a second extension portion extending from the second supporting portion to the one side of the display module; and
a cover portion covering a space between the first extension portion and the second extension portion.

33. The display apparatus of claim 21, wherein:
the display module further comprises a supporting member on the rear surface of the display panel, and the structure is disposed at a rear surface of the supporting member, and
the supporting member comprises a first hole, and the first hole overlaps the vibration generator.

34. The display apparatus of claim 33, further comprising a plate between the supporting member and the structure and configured to cover at least a portion of the first hole of the supporting member.

35. The display apparatus of claim 21, wherein the vibration generator comprises:
a module frame in the structure;
a bobbin on the module frame;
a magnet inside or outside the bobbin;
a coil wound around the bobbin; and
a damper connected between the module frame and the bobbin.

36. The display apparatus of claim 35, wherein:
the display module further comprises a supporting member on a rear surface of the display panel, and the structure is disposed at a rear surface of the supporting member;
the supporting member comprises a first hole, and the first hole overlaps the bobbin.

37. The display apparatus of claim 21, wherein:
the structure is configured to support the vibration generator and to guide a sound generated by the vibration generator to the sound emission port;
the sound emission port is at an edge of the structure;
the structure does not overlap with at least a half of a thickness of the display module along a thickness direction of the display module; and
the structure is not a part of an outermost product cover.

38. The display apparatus of claim 21, wherein:
the vibration generator comprises an electrical or magnetic component; and
the supporting portion comprises an opening portion that overlaps with the electrical or magnetic component of the vibration generator.

* * * * *